United States Patent
Walker et al.

(10) Patent No.: US 7,606,729 B1
(45) Date of Patent: *Oct. 20, 2009

(54) METHOD AND APPARATUS FOR FACILITATING THE PLAY OF FRACTIONAL LOTTERY TICKETS UTILIZING POINT-OF-SALE TERMINALS

(75) Inventors: Jay S. Walker, Ridgefield, CT (US); Andrew S. Van Luchene, Norwalk, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/045,036

(22) Filed: Mar. 20, 1998

Related U.S. Application Data

(63) Continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
*G06Q 30/00* (2006.01)
(52) U.S. Cl. ........................................ 705/14
(58) Field of Classification Search .......... 283/903, 283/49, 67; 463/17; 705/16, 21, 14, 1
See application file for complete search history.

(56) References Cited

U.S. PATENT DOCUMENTS

RE25,600 E 6/1964 Goldwater et al.

(Continued)

FOREIGN PATENT DOCUMENTS

DE 40 09 980 10/1991

(Continued)

OTHER PUBLICATIONS

Heads I win, tails you lose. "The Economist." Jun. 13, 1992, vol. 323, p. 74.*

(Continued)

*Primary Examiner*—Jeffrey D Carlson
(74) *Attorney, Agent, or Firm*—Walker Digital Management, LLC

(57) ABSTRACT

A store controller determines a monetary value, such as an amount of spare change due to a customer, and allocates a portion of a lottery ticket for the customer. The portion is based on the monetary value, and may be, for example, equal to the monetary value, or may be the monetary value rounded to the nearest nickel. The store controller outputs a ticket identifier that identifies the lottery ticket (e.g. a serial number) and a portion identifier that identifies the allocated portion of the lottery ticket (e.g. $0.34 of a $2.00 lottery ticket). Typically, the store controller outputs the identifiers to a POS terminal, which prints a fractional lottery ticket redeemable for a portion of the lottery ticket's prize. The store controller also stores the ticket identifier and the portion identifier, to assure that fraudulent tickets will be detected. After a drawing date of the lottery ticket, the customer redeems the fractional lottery ticket, typically at a POS terminal. The POS terminal communicates with the store controller, which receives the ticket identifier and the portion identifier therefrom. From the received identifiers, the store controller may determine a prize value of the lottery ticket. The customer is in turn provided with a portion of the prize value based on the allocated portion of the ticket.

30 Claims, 13 Drawing Sheets

U.S. PATENT DOCUMENTS

| | | |
|---|---|---|
| 3,222,189 A | 12/1965 | Perrozzi |
| 3,573,747 A | 4/1971 | Adams et al. |
| 3,637,999 A | 1/1972 | Pappas |
| 4,030,632 A | 6/1977 | Harashima |
| 4,108,361 A | 8/1978 | Krause |
| 4,120,452 A | 10/1978 | Kimura et al. |
| 4,157,829 A | 6/1979 | Goldman |
| 4,323,770 A | 4/1982 | Dieulot et al. |
| 4,441,160 A | 4/1984 | Azcua |
| 4,494,197 A | 1/1985 | Troy et al. |
| 4,500,880 A | 2/1985 | Gomersall |
| 4,669,730 A | 6/1987 | Small |
| 4,677,553 A | 6/1987 | Roberts et al. |
| 4,689,742 A | 8/1987 | Troy et al. |
| 4,723,212 A | 2/1988 | Mindrum et al. |
| 4,760,247 A | 7/1988 | Keane et al. |
| 4,764,666 A | 8/1988 | Bergeron |
| 4,815,741 A | 3/1989 | Small |
| 4,825,045 A | 4/1989 | Humble |
| 4,832,341 A | 5/1989 | Muller et al. |
| 4,839,507 A | 6/1989 | May |
| 4,854,590 A | 8/1989 | Jolliff et al. |
| 4,859,838 A | 8/1989 | Okiharu |
| 4,876,592 A | 10/1989 | Von Kohorn |
| 4,882,473 A | 11/1989 | Bergeron |
| 4,902,880 A | 2/1990 | Garczyski |
| 4,908,761 A | 3/1990 | Tai |
| 4,910,672 A | 3/1990 | Off et al. |
| 4,922,522 A | 5/1990 | Scanlon |
| 4,937,853 A | 6/1990 | Brule et al. |
| 4,973,952 A | 11/1990 | Malec et al. |
| 4,982,337 A | 1/1991 | Burr et al. |
| 4,993,714 A | 2/1991 | Golightly |
| 5,056,019 A | 10/1991 | Schultz et al. |
| 5,112,050 A | 5/1992 | Koza |
| 5,119,295 A | 6/1992 | Kapur |
| 5,128,862 A | 7/1992 | Mueller |
| 5,132,914 A | 7/1992 | Cahlander et al. |
| 5,158,293 A | 10/1992 | Mullins |
| 5,172,328 A | 12/1992 | Cahlander et al. |
| 5,173,851 A | 12/1992 | Off et al. |
| 5,177,342 A | 1/1993 | Adams |
| 5,186,463 A | 2/1993 | Marin |
| 5,192,854 A | 3/1993 | Counts |
| 5,193,056 A | 3/1993 | Boes |
| 5,200,889 A * | 4/1993 | Mori ............................ 705/14 |
| 5,201,010 A | 4/1993 | Deaton et al. |
| 5,216,595 A | 6/1993 | Protheroe |
| 5,223,698 A | 6/1993 | Kapur |
| 5,231,569 A | 7/1993 | Myatt |
| 5,235,509 A | 8/1993 | Mueller et al. |
| 5,239,165 A | 8/1993 | Novak |
| 5,243,515 A | 9/1993 | Lee |
| 5,243,652 A | 9/1993 | Teare et al. |
| 5,245,533 A | 9/1993 | Marshall |
| 5,256,863 A | 10/1993 | Ferguson et al. |
| 5,260,553 A | 11/1993 | Rockstein et al. |
| 5,262,941 A | 11/1993 | Saladin et al. |
| 5,269,521 A | 12/1993 | Rossides |
| 5,274,547 A | 12/1993 | Zoffel et al. |
| 5,283,731 A | 2/1994 | Lalonde et al. |
| 5,287,268 A | 2/1994 | McCarthy |
| 5,297,026 A | 3/1994 | Hoffman |
| 5,297,031 A | 3/1994 | Gutterman et al. |
| 5,302,811 A | 4/1994 | Fukatsu |
| 5,305,195 A | 4/1994 | Murphy |
| 5,309,355 A | 5/1994 | Lockwood |
| 5,327,508 A | 7/1994 | Deaton |
| D351,166 S | 10/1994 | Wan |
| 5,353,218 A | 10/1994 | DeLapa et al. |
| 5,353,219 A | 10/1994 | Mueller et al. |
| 5,355,327 A | 10/1994 | Stent |
| 5,371,345 A | 12/1994 | LeStrange et al. |
| 5,371,796 A | 12/1994 | Avarne |
| 5,380,991 A | 1/1995 | Valencia et al. |
| 5,398,932 A | 3/1995 | Eberhardt |
| RE34,915 E | 4/1995 | Nichtberger et al. |
| 5,408,210 A | 4/1995 | Oka |
| 5,417,424 A | 5/1995 | Snowden |
| 5,420,606 A | 5/1995 | Begum et al. |
| 5,428,606 A | 6/1995 | Moskowitz |
| 5,440,108 A | 8/1995 | Tran |
| 5,450,938 A | 9/1995 | Rademacher |
| 5,459,306 A | 10/1995 | Stein et al. |
| 5,464,971 A | 11/1995 | Sutcliffe et al. |
| 5,465,085 A | 11/1995 | Caldwell |
| 5,466,919 A | 11/1995 | Hovakimian |
| 5,475,205 A | 12/1995 | Behm |
| 5,476,259 A | 12/1995 | Weingardt |
| 5,481,094 A | 1/1996 | Suda |
| 5,491,326 A | 2/1996 | Marceau et al. |
| 5,502,636 A | 3/1996 | Clarke |
| 5,504,475 A | 4/1996 | Houdou |
| 5,504,675 A | 4/1996 | Cragun et al. |
| 5,505,449 A | 4/1996 | Eberhardt |
| 5,510,979 A | 4/1996 | Moderi et al. |
| 5,518,239 A | 5/1996 | Johnston |
| 5,521,364 A | 5/1996 | Kimura et al. |
| 5,526,257 A | 6/1996 | Lerner |
| 5,528,490 A | 6/1996 | Hill |
| 5,537,314 A | 7/1996 | Kanter |
| 5,539,189 A | 7/1996 | Wilson |
| 5,544,044 A | 8/1996 | Gerbaulet |
| 5,548,110 A * | 8/1996 | Storch et al. ................. 235/427 |
| 5,557,513 A | 9/1996 | Frey et al. |
| 5,564,546 A | 10/1996 | Molbak |
| 5,564,977 A | 10/1996 | Algie |
| 5,572,653 A | 11/1996 | DeTemple et al. |
| 5,576,951 A | 11/1996 | Lockwood |
| 5,581,064 A | 12/1996 | Riley et al. |
| 5,583,763 A | 12/1996 | Atcheson et al. |
| 5,592,375 A | 1/1997 | Salmon et al. |
| 5,592,376 A | 1/1997 | Hodroff |
| 5,602,377 A | 2/1997 | Beller et al. |
| 5,604,343 A | 2/1997 | Curry |
| 5,611,052 A | 3/1997 | Dykstra et al. |
| 5,612,868 A | 3/1997 | Off et al. |
| 5,613,679 A | 3/1997 | Casa |
| 5,615,269 A | 3/1997 | Micali |
| 5,619,558 A | 4/1997 | Jheeta |
| 5,620,079 A | 4/1997 | Molbak |
| 5,620,182 A | 4/1997 | Rossides |
| 5,621,201 A | 4/1997 | Langhams |
| 5,621,640 A | 4/1997 | Burke |
| 5,621,812 A | 4/1997 | Deaton |
| 5,630,103 A | 5/1997 | Smith |
| 5,632,010 A | 5/1997 | Briechle et al. |
| 5,638,457 A | 6/1997 | Deaton |
| 5,642,485 A | 6/1997 | Deaton |
| 5,644,723 A | 7/1997 | Deaton |
| 5,645,486 A | 7/1997 | Nagao |
| 5,649,114 A | 7/1997 | Deaton |
| 5,652,421 A | 7/1997 | Veeneman |
| 5,655,007 A | 8/1997 | McAllister |
| 5,664,115 A | 9/1997 | Fraser |
| 5,665,953 A | 9/1997 | Mazzamuto et al. |
| 5,687,322 A | 11/1997 | Deaton et al. |
| 5,694,546 A | 12/1997 | Reisman |
| 5,710,887 A | 1/1998 | Chelliah |
| 5,717,866 A | 2/1998 | Naftzger |
| 5,724,886 A | 3/1998 | Ewald et al. |
| 5,759,101 A | 6/1998 | Von Kohorn |
| 5,768,382 A | 6/1998 | Schneier et al. |
| 5,772,510 A * | 6/1998 | Roberts ....................... 463/17 |

| | | | |
|---|---|---|---|
| 5,774,868 A | 6/1998 | Cragun et al. | |
| 5,794,210 A | 8/1998 | Goldhaber et al. | |
| 5,799,086 A | 8/1998 | Sudia | |
| 5,806,045 A | 9/1998 | Biorge et al. | |
| 5,822,735 A | 10/1998 | Naftzger | |
| 5,822,736 A | 10/1998 | Hartman | |
| 5,832,457 A | 11/1998 | O'Brien | |
| 5,845,259 A | 12/1998 | West | |
| 5,845,263 A | 12/1998 | Camaisa | |
| 5,845,276 A | 12/1998 | Emerson | |
| 5,857,175 A | 1/1999 | Day | |
| 5,869,826 A | 2/1999 | Eleftheriou | |
| 5,884,272 A | 3/1999 | Walker et al. | |
| 5,923,016 A | 7/1999 | Fredregill et al. | |
| 5,924,077 A | 7/1999 | Beach et al. | |
| 5,926,796 A | 7/1999 | Walker et al. | |
| 5,930,771 A | 7/1999 | Stapp | |
| 5,946,665 A | 8/1999 | Suzuki | |
| 5,966,695 A | 10/1999 | Melchione et al. | |
| 5,974,399 A | 10/1999 | Giulani et al. | |
| 6,014,641 A | 1/2000 | Loeb et al. | |
| 6,021,390 A | 2/2000 | Satoh et al. | |
| 6,024,288 A | 2/2000 | Gottlich | |
| 6,029,153 A | 2/2000 | Bauchner et al. | |
| 6,039,244 A | 3/2000 | Finsterwald | |
| 6,070,147 A | 5/2000 | Harms | |
| 6,085,164 A | 7/2000 | Smith et al. | |
| 6,088,682 A | 7/2000 | Burke | |
| 6,112,191 A | 8/2000 | Burke | |
| 6,119,099 A | 9/2000 | Walker et al. | |
| 6,223,163 B1 | 4/2001 | Van Luchene | |
| 6,229,879 B1 | 5/2001 | Walker et al. | |
| 6,253,188 B1 | 6/2001 | Witek et al. | |
| 6,296,569 B1 | 10/2001 | Congello | |
| 6,463,585 B1 | 10/2002 | Hendricks et al. | |
| 6,515,680 B1 | 2/2003 | Hendricks et al. | |
| 6,582,304 B2 | 6/2003 | Walker et al. | |
| 6,887,153 B2 | 5/2005 | Walker et al. | |
| 7,272,569 B1 | 9/2007 | Walker et al. | |
| 2003/0037041 A1 | 2/2003 | Hertz | |
| 2003/0120579 A1 | 6/2003 | Carter, III | |

FOREIGN PATENT DOCUMENTS

| | | | |
|---|---|---|---|
| EP | 0 085 546 | | 1/1983 |
| EP | 0 109 189 | | 10/1983 |
| EP | 512413 | | 11/1992 |
| EP | 0 780 788 | | 6/1997 |
| FR | 2 736 177 | | 6/1995 |
| FR | 2 757 656 | | 6/1998 |
| GB | 1 391 060 | | 4/1975 |
| JP | 57086974 | | 5/1982 |
| JP | 57120172 | | 7/1982 |
| JP | 590108827 | | 12/1985 |
| JP | 1211170 | | 8/1989 |
| JP | 2171891 | | 7/1990 |
| JP | 2278399 | | 11/1990 |
| JP | HEI 2 1989 2636700 | | 11/1990 |
| JP | HEI 2-289000 | | 11/1990 |
| JP | 04060900 | | 2/1992 |
| JP | 4095198 | | 3/1992 |
| JP | 600251498 | | 5/1992 |
| JP | 4-260914 | | 9/1992 |
| JP | 4314189 | | 11/1992 |
| JP | 5242363 | | 9/1993 |
| JP | 8-147545 | | 6/1996 |
| JP | 8-329350 | | 12/1996 |
| JP | 09300730 A | | 11/1997 |
| JP | 10031792 | | 2/1998 |
| JP | 11-505343 | | 5/1999 |
| JP | 2197998 | | 8/2000 |
| WO | WO 91/03789 | | 3/1991 |
| WO | WO 96/34358 | | 10/1996 |
| WO | WO 96/36926 | | 11/1996 |
| WO | WO 97/28510 | | 2/1997 |
| WO | WO 9735441 | | 9/1997 |
| WO | WO 97/46961 | | 12/1997 |
| WO | WO 97/50064 | | 12/1997 |
| WO | WO 98/43149 | | 10/1998 |

OTHER PUBLICATIONS

Herman, Ken, "Auchan cashes in on Lottery", Jul. 1, 1992, Houston Post, p. A15.*

Louise Cook, "Consumer Watch: Clip, Snip, Save", The Associated Press, Mar. 12, 1984, Monday PM Cycle.

"Coupons Get Serious; Supermarkets Use Barcodes to Prevent Misredemptions", Chain Store Age Executive with Shopping Center Age, Oct., 1992, Vol. 68; No. 10; at p. 68; ISSN: 0193-1199.

Joseph Bonnici, David P. Campbell, William B. Fredenberger, Kathryn H. Hunnicutt; "Consumer Issues in Coupon Usage. An Exploratory Analysis", Journal of Applied Business Research, Winter 1996/1997, vol. 13, No. 1 at p. 31-40; ISSN: 0892-7626.

Jim Kirk, "Digital Promotions Make Quick Point—McDonald's Testing New Technology on its Menus", Chicago Tribune, Dec. 26, 1997 at p. 1-2.

"Progressive Introduces Kitchen Display System (KDS) for Restaurants", PR Newswire, Jan. 23, 1998, Financial News Section.

Adam Blair, "JICC Coupon Guide Recommends Upgrades at Front End", Supermarket News, Feb. 9, 1998, at p. 23; ISSN: 0039-5803.

"From Our Family To Yours . . . 5 Weeks of Coupon Values for a Variable Customer", Wakefern Food Corporation, Feb. 1998.

"U.P.C. Coupon Code Guidelines Manual—Section . . .", Uniform Code Council, Inc., (http://www.uc-council.org/d31-3.htm) download date: Mar. 12, 1998.

"Advanced Mechanics Internet Specials", Advanced Mechanics,(http://www.metroplexweb.com/advcpn2.htm), download date: Mar. 12, 1998.

Mark Hamstra, "'Made-for -you' maneuvers signal competitive shift in QSR category", Nations Restaurant News, Apr. 13, 1998, 3 pgs.

"New Wave Marketing", Promotion Times an SCA Quarterly Newsletter, Apr. 1998.

Universal Holding Cabinet Rollout Program Brochure, H&K Dallas Inc., Winter 1998.

NCR 7453 PC-Based Point-of-Sale Solution Brochure, NCR, Winter 1998.

"POSitive Input; The McDonald's POS-3 System Newsletter from Olivetti Solutions", McDonald's, Spring/Summer Edition 1998, 8 pgs.

"It's In The Bag. Introducing the Universal Holding Cabinet From Welbilt", Frymaster, 1998 brochure.

"Introducing the Digital MenuBoard", Siren Technologies, brochure.

"For the Crew & the Customer—The Best Drive-Thru & Grill Service", Olivetti, brochure.

"Cape Town", Reuters, Nov. 8, 1979, Thursday PM Cycle.

"Save The Mark", Financial Times (London), Feb. 1, 1983, Section 1: Men & Matters at p. 12.

"Farm Bills Please Associations; National Grocers Association", Supermarket News, Dec. 23, 1985, vol. 35 at p. 6.

"POS Spectrum: A Lottery Looks to POS for Growth", POS News, Jan. 1989 vol. 5, No. 7 at p. 8.

Robert Kuttner, "Computers May Turn The World Into One Big Commodities Pit", Business Week, Sep. 11, 1989, Ecomomic Viewpoint Section at p. 17.

Micahel Schrage, "An Experiment in Economic Theory: Labs Testing Real Markets", The Record, Nov. 26, 1989, Sunday, All Editions, Business Section at p. B01.

"Let's Play the Cash Register Receipts Lottery", The New York Times, Dec. 25, 1990, Late Edition—Final Section 1 at p. 30.

"Philips Offers Customers Financing Through Citicorp; Philips Medical Systems North America, Citicorp North America Inc.", Health Industry Today, Jun. 1991, vol. 54; No. 6; ISSN: 0745-4678 at p. 4.

Laura Del Rosso, "Marketel Says It Plans To Launch Air Fare 'Auction' In June", Travel Weekly, Apr. 29, 1991, vol. 50; No. 34 at p. 1.

Jeff Pelline, "Travelers Bidding on Airline Tickets SF Firm Offers Chance For Cut-rate Fares", The San Francisco Chronicle, Aug. 19, 1991, Monday, Final Edition at p. A4.

Laura Del Rosso, "Ticket-bidding Firm Closes Its Doors; Marketel International Brief Article", Travel Weekly, Mar. 12, 1992, vol 51; No. 21; ISSN: 0041-2082 at p. 1.

"Winn-Dixie/The Salvation Army Report Contribution For War Against Hunger", PR Newswire, Jun. 10, 1993, Financial News Section.

Jeanne Jones, "Data Readers Streamline Management; Scanner Technology Aids Retailers As Well As Plants, Wholesalers", The Houston Post, Jun. 26, 1994, Business Section at p. D1.

Phillip Fiorini, "No Place For Penny?" Smallest Coin Doesn't Make Cents to Some, USA Today, Jul. 29, 1994, Final Edition at p. 1A.

Alison Smith, "Survey of UK Consumer Credit and Asset Finance:", Financial Times, Nov. 3, 1994 at p. V1.

Tom Andreoli, Jeff Borden, Beth Healy 7, Steven R. Strahler and Mark Veverka, "Cash Machines Offer a Whole Lotto Money For Withdrawal . . . ", Crain's Chicago Business, Jun. 19, 1995, News Section at p. 8.

"Spain: BBV Launches New Card", Cards International, Jun. 22, 1995 at p. 5.

Jim Knippenberg, "Psst! Will Local Radio Empires Strike Back?", The Cincinnati Enquirer, Jul. 23, 1995 at p. F01.

"Cyber Bid", Net Fund Ltd., Copyright 1996, Brochure.

Kimberly Hadley, "Pastors Praying Anti-arson Effort Will Burn Bias", The Nashville Banner, Jul. 26, 1996 at p. A13.

John Gapper, "NatWest Reports Rise in Bad Debt", Financial Times, Jul. 31, 1996, London Edition 3, News: UK Section at p. 09.

Lynx Technology: Lynx To Provide Business Leasing Programme.

Paul Taylor, "Towards a Dream Market", Financial Times (London), Sep. 4, 1996 at p. 03.

Gilbert Rehayem "Opinion:X-Press Betting", LaFleur's Lottery World, Feb. 7, 1997 at p. 4.

Michelle Singletary, "Electronic World, Unchecked Problem? U.S. Move to Paperless Payments Raises Worries About Those Who Don't Use Banks", The Washington Post, Mar. 4, 1997, Final Edition Financial Section at p. C01.

"Avco Financial Services", National Home Furnishing Association, (http:/www.homefurnish.com/NHFA/avco.htm), download date: May 23, 1997.

"Products and Services: Checkout Direct", Catalina Marketing Corporation, (http://catalinamktg.com/prodcdir.htm), download date: May 29, 1997.

Bertram v. Burke, "Funneling Change to Useful Pursuits", The New York Times, Jun. 9, 1997, Section D; at p. 2.

"The Key to Your Identity: Falling Costs Will Allow Fingerprint Verification to be Widely Used Reports Geoff Nairn", Financial Times (London), Jul. 15, 1997, Technology Section at p. 12.

"The United Computer Exchange, How It All Works", The United Computer Exchange Corporation, (http://www.uce.comhowitworks.htm), download date: Jul. 23, 1997.

"Classified2000: the Internet Classifieds", Classifieds 2000, Inc. (http://www.classifieds2000.com/cgi-cls/Display.exe?C2K+abouts), download date: Aug. 6, 1997.

"General Trading Floor Information and Terms Provided by tradingfloor.com", (http//www.tradingfloor.com/info.htm), download date: Aug. 14, 1997.

"NASDAQ-Information Sheet", (http://home.axford.com/corfin/corfl 1.htm), download date: Aug. 15, 1997.

Kathy Prochaska-Cue, Acquiring Credit, (http://ianrwww.un1.edu/IAN/PUBS/NEBFACTS/NF91-2HTM), download date: Sep. 3, 1997.

"Welcome to ONSALE: Auction Supersite", ONSALE, (http://www.onsale.com/category/inv/00124972.htm), download date: Sep. 8, 1997.

"About IAO", Interactive Auction Online, (http://www.iaoauction.com/about.htm), download date: Sep. 8, 1997.

John Kelsey, Bruce Schneier, "Conditional Purchase Orders", Fourth ACM Conference on Computer Communication Security, Apr. 1997, ACM Press at p. 117-124.

Kimball Livingston, "In Store Systems—VideOCart Redux", RT Magazine, Mar. 1998 at p. 29-30.

Myhre, James W., "Examiner's Affidavit", dated Feb. 22, 2001.

"Point-of-sale: cash-back feature at the point-of-sale emerges as new trend in EFT industy," EFT Report, Apr. 18, 1988, vol. 11, Iss. 8, p. 6.

"POS spectrum: California bets on POS to spur its lottery sales," POS News, Aug. 1990, vol. 7, Iss. 3, p. 1.

"Sharing the winnings," Boston Globe, Apr. 2, 1995, p. 80.

Anonymous, Point-of-sale: cash-back feature at the point of sale emerges as new trend in EFT industry. Apr. 18, 1988, 1 pg.

POS spectrum: California bets on POS to spur its lottery sales POS News, Aug. 1990, vol. 7, Issue 3, 1 pg.

"Sharing the winnings", Boston Globe, Apr. 2, 1995, 1 pg.

Downing, Neil, "Money Line: IF 12 people share a winning ticket, they'll have to share a single check", Providence Journal—Bulletin, Oct. 17, 1995, 3 pp.

Glickman, Jeff, 10 Infomercial Facts You Need to Know (Supplement: The Infomercial—Special Sourcebook Issue), Adweek Eastern Edition, vol. 34, No. 10, Mar. 8, 1993, 6 pp.

Goodstein, Ronald C., "UPC scanner pricing systems: Are they accurate?", Journal of Marketing, Apr. 1994, vol. 58, No. 2, pp. 20-30, ISSN: 0022-2429, 17 pp.

Stankevich, Debby Garbato, "Cook's Warehouse sets heavy-gauge nonstick.", HFN The Weekly Newspaper for the Home Furnishing Network, Aug. 14, 1995, Section: vol. 69, No. 33, 2 pp.

Rodwin, Marc A., "Consumer protection and managed care: The need for organized consumers", Health Affairs, Fall 1996, vol. 15, No. 3, pp. 110-123, ISSN: 0278-2715, CODEN: FRBPBN, 11 pp.

Kennedy, Doug, "Train front desk staff in sales; hotel industry", Hotel & Motel Management, Mar. 3, 1997, Section: No. 4, vol. 212, ISSN: 0018-6082, 2 pp.

"Magazine Subscription Sales Center—Where Buying Subscriptions is Easy!", Customer Service Information, Interactive Magazine Sales, Inc., e-mail: aim@panix.com, 2 pp.

Howland, Jennifer, "National Distribution: Scanning the Future", Folio: The Magazine for Magazine Management, Feb. 1985, Section: vol. 14, p. 69, ISSN: 0046-4333, 11 pp.

Wood, Wally, "Circulation Marketing: Let Your Magazine Do the Selling", Folio: The Magazine for Magazine Management, Jun. 1985, vol. 14, p. 78, ISSN: 0046-4333, 10pp.

Reese, Diane, "Revitalizing Single-Copy Sales", Folio: The Magazine for Magazine Management, Feb. 1986, vol. 15, p. 84, ISSN: 0046-4333, 14 pp.

Joyce, Walter, "Muscular Merchandising: column", Folio: The Magazine for Magazine Management, Jun. 1986, vol. 15, p. 124, ISSN: 0046-4333, 5pp.

"Phoenix Papers to Sell Merchandise to Build Awareness", Editor & Publisher, Sep. 17, 1988, vol. 121, Issue 38, p. 23, ISSN: 0013-094X, 2pp.

Donaton, Scott, "Gift Subscriptions Find Retail Niche", Advertising Age, Jul. 16, 1990, Section: News at p. 37, 2pp.

Guy, Pat, "A Gift Off the Rack: Mag Subscription", USA Today, Dec. 19, 1990, Section: Money at p. B2, 2pp.

Jaben, Jan, "Magazine Gift-giving Made Simple at Retail Outlets; Time Inc., Hearst, Meredith Test Subscriber Systems' Method of Selling Gift Subscriptions; News" Feb. 15, 1991, vol. 3, No. 2, p. 15, ISSN: 1043-8688, 3pp.

Horton, Liz, "Holiday Gift Subs Up, Some Due to Novel Promotions", Folio: The Magazine for Magazine Management, Feb. 1, 1992, Section: vol. 21, No. 2, p. 39, ISSN: 0046-4333, 1 pg.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333, 3pp.

Manly, Lorne, "A Newsstand for the Electronic Age", Folio: The Magazine for Magazine Management, Sep. 15, 1993, vol. 22, No. 16, p. 17, ISSN: 0046-4333, 3pp.

Hochwald, Lambeth, "Sub Sources that Break With Tradition", Folio: The Magazine for Magazine Management, May 1, 1994, vol. 23, Issue 8, pp. 46-48, ISSN: 0046-4333, 4pp.

Love, Barbara, "Selling Subscriptions at Newsstands", Folio: The Magazine for Magazine Management, Jun. 1, 1994, vol. 23, Issue 10, p. 10, ISSN: 0046-4333, 2pp.

Cyr, Diane, "Distribution Woes; Declining Newsstand Circulation; Includes Related Article On Preventing Newsstand Fraud", Folio:

The Magazine for Magazine Management, Jan. 1995, vol. 23, No. 19, p. 170, ISSN: 0046-4333, 5pp.
Love, Barbara, "Folio: Plus Circulation; Techniques for Managing Magazine Circulation", Folio: The Magazine for Magazine Management, Jan. 1995, vol. 23, No. 19, p. 159, ISSN: 0046-4333, 2pp.
Kelly, Keith J., "Hearst Opens a Cyberspace Newsstand", Advertising Age, Jan. 30, 1995, vol. 66, Issue 5, p. 14, ISSN: 0001-8899, 2pp.
Schnuer, Jenna, "Overnight Options Add to Distribution Mix; Distribution of "Inside Sports" Magazine ", Folio: The Magazine for Magazine Management, Mar. 1, 1995, vol. 24, No. 4, p. 19, ISSN: 0046-4333, 2pp.
Kelly, Keith J., "Publishers Pine for Cyber-Profits", Time, Inc., Mar. 13, 1995, vol. 66, Issue 11, pp. S-22, ISSN: 0001-8899, 1p.
Wilson, Steve, "Out of Print—but Not Business; Magazines Move Away From Print in Favor of Electronic Publishing", Folio: The Magazine for Magazine Management, May 1, 1995, vol. 24, No. 8, p. 22, ISSN: 0046-4333, 2pp.
Hochwald, Lambeth, "Postal Blues: Circulators Cope With the Rate Crunch", Folio: The Magazine for Magazine Management, May 1, 1995, vol. 24, No. 8, p. 54, ISSN: 0046-4333, 3pp.
"Tretorn Offers Magazine Promo", AdWeek, May 1, 1995, Section: Newswire, 1pg.
"Lotto World", MediaWeek, May 8, 1995, vol. 5, No. 19 at p. 16, 1pg.
Graham, Anne, "Nonmember Subs—Or Not? Non-Member Subscriptions to Association Magazines; Includes Tips from Publishers", Folio: The Magazine for Magazine Management, Jun. 1, 1995, vol. 24, No. 10, p. 47, ISSN: 0046-4333, 4pp.
Miller, Paul, "Magazine Deal Lacks Catalog Appeal; Brief Article", Folio: The Magazine for Magazine Management, Jun. 15, 1995, vol. 24, No. 11, p. 30, ISSN: 0046-4333, 2pp.
Wilson, Steve, "Directory Assistance: A Buyer's Guide Can Give You a Big Boost in Revenue and Attract New Advertisers and Subscribers", Folio: The Magazine for Magazine Management, Oct. 1, 1995, vol. 24, No. 16, p. 40, ISSN: 0046-4333, 6pp.
Garratt, David, "What Premium on On-Cover Premiums?", Folio: The Magazine for Magazine Management, Oct. 1, 1995, vol. 24, No. 16, p. 53, ISSN: 0046-4333, 3pp.
"HFS Incorporates and Hatches Filipacchi Magazines; Announce Launch of Century 21 House & Home Magazine . . . ", Business Wire, Nov. 20, 1995, 2pp.
Hochwald, Lambeth, "Circulation Secrets: Nine Steps to a Successful Circulation Launch Strategy Includes List of Resources", Folio: The Magazine for Magazine Management, Feb. 1, 1996, vol. 25, No. 2, p. 53, ISSN: 0046-4333, 5pp.
Kerwin, Anne Marie, "Notably at the Newsstand: InStyle, Financial World Push for Greater Single-Copy Sales", Inside Media, Feb. 7, 1996, vol. 8, No. 3, p. 26, ISSN: 1046-5316, 2pp.
Adams, Mark, "Capell Reports Sales Drop at Newsstands", Mediaweek, Mar. 11, 1996, vol. 6, No. 11, p. 27, ISSN: 1055-176X, CODEN:MADEAP, 1pg.
Lang, Joan, "Round n' Round They Go", May 1, 1996, Restaurant Business, vol. 96, No. 7, pp. 132-134, 2pp.
Schnuer, Jenna, "A World Without Magazines? Consumers Weigh In. Survey of Consumers Indicates That . . . ", Folio: The Magazine for Magazine Management, Jun. 1, 1996, vol. 25, No. 9, p. 16, ISSN: 0046-4333, 2pp.
Hodges, Jane, "WSJ Puts Squeeze on Web Subscriptions", Advertising Age, Apr. 29, 1996, vol. 67, Issue 18, p. 34, ISSN: 0001-8899, 2pp.
Tedesco, Richard, "Time Launches 'Net Subscription Service'", Broadcasting & Cable, Nov. 11, 1996, vol. 126, Issue 47, p. 65, ISSN: 1068-6827, 1pg.
Reilly, Brian, "Upselling' Strategies Hit the Net", Advertising Age's Business Marketing, Chicago, Dec. 1996, 1pg.
Webster's II, New Riverside University Dictionary, 1994, Houghton-Mifflin Company, 3pp..
"Hearst Corporation Launches 'The Multimedia Newsstand'", Link-Up, Mar./Apr. 1995, vol. 12, Issue 2, pp. 1 & 36, ISSN: 0739-988X, 1 pg.
"The Super Subs", Precision Marketing, Oct. 24, 1994, No. 0, vol. 0, 5 pp.
Office Action for U.S. Appl. No. 08/920,116, dated Oct. 1, 1999, 7pp.

Notice of Allowance for U.S. Appl. No. 08/920,116, dated Oct. 25, 1999, 13pp.
Office Action for U.S. Appl. No. 09/442,754, dated Aug. 2, 2000, 10pp.
Office Action for U.S. Appl. No. 09/442,754, dated Jan. 16, 2001, 11pp.
Office Action for U.S. Appl. No. 09/442,754, dated Aug. 1, 2001, 6pp.
Notice of Allowability for U.S. Appl. No. 09/442,754, dated Dec. 7, 2001, 3pp.
Notice of Allowance for U.S. Appl. No. 09/442,754, dated Oct. 1, 2002, 7pp.
Supplemental Allowance for U.S. Appl. No. 09/442,754, dated Mar. 4, 2003, 5pp.
Notice of Allowance for U.S. Appl. No. 10/625,089 dated Apr. 2, 2008, 9 pp.
Office Action for U.S. Appl. No. 10/625,089 dated Sep. 10, 2007, 11 pp.
Office Action for U.S. Appl. No. 10/625,089 dated Apr. 5, 2006, 7 pp.
Office Action for U.S. Application No. 10/625,089 dated Oct. 24, 2005, 7 pp.
Office Action for U.S. Application No. 10/642,978 mailed Aug. 1, 2006, 20 pp.
Office Action for U.S. Appl. No. 10/642,978 mailed Feb. 21, 2006, 10 pp.
Office Action for U.S. Appl. No. 10/642,978 mailed Jun. 28, 2005, 8 pp.
Office Action for U.S. Appl. No. 09/107,971 mailed Jul. 10, 2002, 30 pp.
Office Action for U.S. Appl. No. 09/107,791 mailed Feb. 2, 2004, 28 pp.
Office Action for U.S. Appl. No. 11/456,271 mailed Dec. 31, 2007, 10 pp.
Office Action for U.S. Appl. No. 09/390,430 mailed Jun. 18, 2003, 17 pp.
Office Action for U.S. Appl. No. 09/390,430 mailed Sep. 23, 2002, 17 pp.
International Search Report for PCT/US2000/21318 mailed Nov. 22, 2000, 3 pp.
Notice of Allowance and Issue Fee Due for U.S. Appl No. 08/822,709 mailed Jan. 16, 2001, 3 pp.
Office Action for U.S. Appl. No. 08/822,709 mailed Feb. 17, 2000, 6 pp.
Office Action for U.S. Appl. No. 08/822,709 mailed Jun. 23, 1999, 5 pp.
Notice of Allowance for U.S. Appl. No. 09/836,409 mailed Jan. 13, 2003, 4 pp.
Office Action for U.S. Appl. No. 09/836,409 mailed Nov. 20, 2002, 4 pp.
Notice of Allowance for U.S. Appl. No. 09/836,409 mailed Sep. 25, 2002, 4 pp.
Notice of Allowance for U.S. Appl. No. 09/836,409 mailed May 16, 2002, 4 pp.
Office Action for U.S. Appl. No. 09/836,409 mailed Oct. 1, 2002, 6 pp.
Notice of Allowance for U.S. Appl. No. 10/424,362, mailed Nov. 11, 2004, 7 pp.
Office Action for U.S. Appl. No. 10/424,362 mailed Jun. 9, 2004, 6 pp.
Office Action for U.S. Application No. 10/424,362 mailed Nov. 19, 2003, 11 pp.
Notice of Acceptance for Canadian Application No. 2,284,662 dated Oct. 3, 2003, 1 pg.
Office Action for Canadian Application No. 2,284,662 mailed Jan. 29, 2003, 3 pp.
Office Action for European Application No. 98 013 082 mailed Jul. 24, 2006, 5 pp.
Translation of Office Action for Japanese Application No. 545921/98, mailed Feb. 18, 2003, 4 pp.
Translation of Office Action for Japanese Application No. 545921/98, mailed Jun. 13, 2006, 8 pp.
Translation of Office Action for Japanese Application No. 2005-230017 mailed Nov. 9, 2007, 6 pp.

Office Action for U.S. Appl. No. 09/045,386, dated Aug. 15, 2000, 10pp.
Office Action for U.S. Appl. No. 09/045,386, dated Mar. 14, 2001, 13pp.
Office Action for U.S. Appl. No. 09/045,386, dated Oct. 11, 2001, 4pp.
Office Action for U.S. Appl. No. 09/045,386, dated Jul. 1, 2002, 6pp.
Office Action for U.S. Appl. No. 09/045,386, dated Mar. 7, 2003, 7 pp.
Office Action for U.S. Appl. No. 09/045,386, dated Nov. 23, 2004, 6pp.
Notice of Allowance for U.S. Appl. No. 09/045,386 dated May 23, 2007, 7 pp.
Office Action for U.S. Appl. No. 09/045,386, dated Mar. 14, 2001, 13pp.
Notice of Allowance U.S. Appl. No. 09/045,386 dated Jan. 10, 2006, 7 pp.
Supplemental Notice of Allowability for U.S. Appl. No. 09/045,386, dated Mar. 20, 2006, 3pp.
Office Action for U.S. Appl. No. 09/045,347, dated Sep. 22, 2000, 8pp.
Office Action for U.S. Appl. No. 09/045,347, dated Apr. 10, 2001, 2pp.
Office Action for U.S. Appl. No. 09/045,347, dated May 6, 1999, 6pp.
Office Action for U.S. Appl. No. 09/045,347, dated Jan. 11, 2000, 7pp.
Office Action for U.S. Appl. No. 09/933,588, dated Jan. 23, 2007, 10pp.
Office Action for U.S. Appl. No. 09/933,588, dated Aug. 28. 2006, 7pp.
Office Action for U.S. Appl. No. 09/083,689, dated Jun. 23, 1999, 11pp.
Notice of Allowability for U.S. Appl. No. 09/083,689, dated Jan. 31, 2000, 2pp.
Office Action for U.S. Appl. No. 09/083,689, dated Aug. 2, 2000, 19pp.
Office Action for U.S. Appl. No. 09/083,689, dated Jan. 16, 2001, 9pp.
Office Action for U.S. Appl. No. 09/083,689, dated Jul. 25, 2001, 9pp.
Office Action for U.S. Appl. No. 09/083,689, dated Mar. 18, 2002, 13 pp.
Notice of Allowability and Fees Due for U.S. Appl. No. 09/045,518, mailed Aug. 30, 2005, 7 pp.
Notice of Allowability for U.S. Appl. No. 09/045,518, dated Feb. 3, 2005, 9 pp.
Decision on Appeal for U.S. Appl. No. 09/045,518, dated May 6, 2004, 62pp.
Office Action for U.S. Appl. No. 09/045,518, dated Apr. 5, 2002, 16pp.
Office Action for U.S. Appl. No. 09/045,518, dated Jul. 2, 2001, 12pp.
Office Action for U.S. Appl. No. 09/045,518, dated Feb. 13, 2001, 16pp.
Office Action for U.S. Appl. No. 09/045,518, dated Jun. 6, 2000, 9pp.
Office Action for U.S. Appl. No. 11/160,499 dated Nov. 15, 2007, 9 pp.
Office Action for U.S. Appl. No. 11/160,499, dated Nov. 30, 2006, 5pp.
Office Action for U.S. Appl. No. 11/160,499, dated Mar. 15, 2006, 6pp.
Notice of Allowability for U.S. Appl. No. 09/076,409, dated Mar. 27, 2001, 6pp.
Office Action for U.S. Appl. No. 09/076,409, dated Jan. 5, 2000, 6pp.
Office Action for U.S. Appl. No. 09/076,409, dated Apr. 13, 1999, 5pp.
Notice of Allowability for U.S. Appl. No. 10/678,058, dated Aug. 9, 2004, 8pp.
Office Action for U.S. Appl. No. 09/643,668, dated Dec. 23, 2002, 12pp.
Notice of Allowability for U.S. Appl. No. 09/643,688, dated Aug. 9, 2004, 5pp.
Office Action for U.S. Appl. No. 11/099,287, dated Jan. 10, 2008, 9pp.
Office Action for U.S. Appl. No. 11/099,287, dated Apr. 6, 2007, 10pp.
Office Action for U.S. Appl. No. 11/099,287, dated Jul. 12, 2006, 10 pp.
Notice of Allowability for U.S. Appl. No. 09/045,084, dated Nov. 6, 2000, 6pp.
Office Action for U.S. Appl. No. 09/045,084, dated Apr. 3, 2000, 10pp.
Office Action for U.S. Appl. No. 09/045,084, dated Sep. 1. 1999, 6pp.
Office Action for U.S. Appl. No. 09/777,297, dated Jul. 8, 2004, 6pp.
Office Action for U.S. Appl. No. 09/083,483, dated Feb. 22, 2000, 8pp.
Office Action for U.S. Appl. No. 09/083,483, dated Nov. 22, 2000, 7pp.
Notice of Allowability for U.S. Appl. No. 09/083,483 dated Feb. 12, 2001, 4 pp.
Notice of Allowance for U.S. Appl. No. 09/858,458, dated Oct. 31, 2006, 11pp.
Interview Summary for U.S. Appl. No. 09/858,458, dated Aug. 14, 2006, 3pp.
Interview Summary for U.S. Appl. No. 09/858,458, dated Aug. 9, 2006, 3pp.
Office Action for U.S. Appl. No. 09/858,458, dated Mar. 24, 2006, 10pp.
Office Action for U.S. Appl. No. 09/858,458, dated Jun. 29, 2005, 9pp.
Office Action for U.S. Appl. No. 09/858,458, dated Jan. 26, 2005, 21pp.
Notice of Allowability for U.S. Appl. No. 09/083,483, dated Aug. 10, 2006, 6pp.
Notice of Allowance for U.S. Appl. No. 09/603,677, dated Apr. 10, 2008, 5pp.
Notice of Allowance for U.S. Appl. No. 09/603,677, dated Oct. 10, 2007, 6pp.
Office Action for U.S. Appl. No. 09/603,677, dated Mar. 22, 2007, 22pp.
Office Action for U.S. Appl. No. 09/603,677, dated Dec. 14, 2004, 22pp.
Office Action for U.S. Appl. No. 09/603,677 dated Aug. 11, 2004, 31pp.
Office Action for U.S. Appl. No. 09/603,677, dated Dec. 12, 2003, 38pp.
Office Action for U.S. Appl. No. 09/603,677, dated Mar. 11, 2003, 8pp.
Notice of Allowance for U.S. Appl. No. 10/678,056 dated Oct. 30, 2007, 8pp.
Office Action for U.S. Appl. No. 11/099,287 dated Jan. 10, 2008, 9 pp.
Office Action for U.S. Appl. No. 11/099,287 dated Apr. 6, 2007, 10 pp.
Office Action for U.S. Appl. No. 11/099,287 dated Jul. 12, 2006, 7 pp.
International Search Report for Application No. PCT/US98/17287 dated Apr. 16, 1999, 2pp.
Written Opinion for Application No. PCT/US98/17287 dated Sep. 13, 1999, 5pp.
International Preliminary Examination Report for PCT/US98/17287 dated Dec. 20, 1999, 5pp.
International Search Report for PCT/US98/16985, mailed Apr. 12, 2002, 3 pp.
Office Action for Application No. PCT/US98/17274 dated Sep. 30, 2002, 2 pp.
Office Action for Application No. 200-508047 dated Apr. 2, 2002, 8 pp.
Office Action for Application No. 2299341 dated Dec. 17, 2001, 2 pp.
Office Action for Application No. 2299341 dated Feb. 3, 2004, 7 pp.
International Search Report for Application No. PCT/US98/17274 dated Apr. 12, 1999, 4 pp.
Written Opinion for Application No. PCT/US98/17274 dated Feb. 23, 2000, 7pp.
International Preliminary Examination Report for PCT/US98/17274 dated Jun. 22, 2000, 8 pp.

International Search Report for PCT/US01/09045 dated Oct. 23, 2001, 4 pp.
International Preliminary Examination Report for PCT/US01/09045 dated Sep. 18, 2002, 3 pp.
Office Action for U.S. Appl. No. 11/425,211 dated Mar. 26, 2008, 5 pp.
Office Action for U.S. Appl. No. 11/425,228, dated May 12, 2008, 7 pp.
Office Action for U.S. Appl. No. 11/425,228, dated Jul. 25, 2007, 6 pp.
Office Action for U.S. Appl. No. 11/425,232, dated Mar. 18, 2008, 6 pp.
Office Action for U.S. Appl. No. 09/107,971, dated Oct. 21, 2003, 25 pp.
Office Action for U.S. Appl. No. 09/107,971, dated Oct. 3, 2001, 25 pp.
Office Action for U.S. Appl. No. 11/456,276, dated Dec. 31, 2007, 10 pp.
Office Action for U.S. Appl. No. 10/457,101, dated Dec. 31, 2007, 10 pp.
Notice of Allowance for U.S. Appl. No. 10/457,101, dated Nov. 7, 2007, 4 pp.
Office Action for U.S. Appl. No. 10/457,101 dated May 25, 2007, 13 pp.
Office Action for U.S. Appl. No. 10/457,101 dated Oct. 20, 2006, 12 pp.
Notice of Allowance for U.S. Appl. No. 11/058,653 dated Jun. 4, 2008 7 pp.
Office Action for U.S. Appl. No. 11/058,653 dated May 15, 2007, 5 pp.
Wyatt, Craig, "Usage Models Just for Merchants", Credit Card Management, vol. 8, No. 6, pp. 32-38, Sep. 1995, 4 pp.
Georgia Almanac, U.P.I., Regional News, Jan. 27, 1983, 2 pp.
"Major Appliances: Tappan unveils microwave oven feature preprogrammed controls.", HFD, Sep. 10, 1984, 1 pg.
Silverman, Gene, "Planning and using infomercial campaigns effectively", Direct Marketing, Sep. 1995, vol. 58, No. 5, 4 pp.
McKinney, Jeff, "Merchant program could pay off for Provident", The Cincinnati Enquirer, Mar. 24, 1996, Section: Financial, 2 pp.
Raab, David M., "Package Aids Catalog Management", DM News, Apr. 22, 1996, Section: Software Review, 2 pp.
"Bigger Plans (Provident Bank, issuer of MeritValue customer loyalty card, plans to offer program in 25 cities in six months)", Card Fax, Oct. 7, 1996, vol. 96, No. 178, 1 pg.

Symons, Allene, "Lucky, Sav-on debut Rewards Card.", Drug Store News, Feb. 17, 1997, vol. 19, Issue 4, ISSN: 0191-7587, 2 pp.
Mckeveny, Alexander, "Giving them a good reason.", Bank Marketing, Mar. 1997, vol. 29, Issue 3, ISSN: 0888-3149, 5 pp.
Brochure: "Reaching Out In New Directions", First Data Corporation, Merchant Services, undated. 14 pp.
Fickenscher, Lisa, "Amex to Start Free Rewards Program with Discounts on Merchandise", The American Banker, Oct. 18, 1996, Section: Credit/Debit/ATMs 2 pp.
Fitzgerald, Kate, "Amex Program Moves Loyalty To Next Level: Custom Extras Finds A Medium Customers Can't Ignore: Billing Statements", Advertising Age, Nov. 4, 1996, Section: News 2 pp.
Fickenscher, Lisa, "Merchant: American Express Seeks to Mine Its Data on Cardholder Spending Patterns", The American Banker, Mar. 24, 1997, Section: Credit/Debit/ATMs 2pp.
Herman, Ken, "Lottery's losers: Small stores; Big pots bring big problems", The Austin-American Statesman, Nov. 23, 1996, 4 pp.
Quittner, Jeremy, "Ohio's Provident brings its discount card to Fla.", American Banker, Feb. 11, 1997, vol. 162, Issue 28, 2 pp.
Notice of Allowance for U.S. Appl. No. 10/625,089 mailed Oct. 6, 2008, 9 pp.
Office Action for U.S. Appl. No. 09/107,971 mailed Oct. 28, 2008, 10 pp.
Office Action for U.S. Appl. No. 09/107,971 mailed Dec. 18, 2008, 10 pp.
Office Action for U.S. Appl. No. 11/456,271 mailed Aug. 19, 2008, 8 pp.
Office Action for U.S. Appl. No. 11/456,276 mailed aug. 20, 2008, 7 pp.
Office Action for U.S. Appl. No. 09/933,588 mailed Apr. 7, 2009, 8 pp.
Office Action for U.S. Appl. No. 11/160,499 mailed Dec. 5, 2008, 9 pp.
Office Action for U.S. Appl. No. 11/099,287 mailed Oct. 28, 2008, 18, pp.
Office Action for U.S. Appl. No. 11/456,276 mailed May 28, 2009, 9 pp.
Office Action for U.S. Appl. No. 11/456,271 mailed May 29, 2009, 11 pp.
Office Action for U.S. Appl. No. 11/099,287 mailed Jul. 6, 2009, 23 pp.

* cited by examiner

| TICKET IDENTIFIER 90 | DRAWING DATE 92 | TICKET NUMBERS 94 | UNALLOCATED PORTION 96 | TICKET PRICE 98 |
|---|---|---|---|---|
| 1234560 | 2/10/98 | 11,12,13,04,21,34 | $0.12 | $1.00 |
| 1234561 | 2/10/98 | 01,21,04,25,13,11 | $0.31 | $1.00 |
| 1234562 | 2/10/98 | 11,25,35,04,06,03 | $0.23 | $1.00 |
| 1234563 | 2/10/98 | 01,20,30,16,28,13 | $0.78 | $1.00 |
| 1234564 | 2/10/98 | 02,30,21,26,24,01 | $0.10 | $1.00 |

| TOTAL REMAINING UNALLOCATED AMOUNT | $1.54 |
|---|---|

| TICKET IDENTIFIER | DRAWING DATE | TICKET NUMBERS | UNALLOCATED PORTION | TICKET PRICE |
|---|---|---|---|---|
| 1234560 | 2/10/98 | 11,12,13,04,21,34 | $0.12 | $1.00 |
| 1234561 | 2/10/98 | 01,21,04,25,13,11 | $0.31 | $1.00 |
| 1234562 | 2/10/98 | 11,25,35,04,06,03 | $0.23 | $1.00 |
| 1234563 | 2/10/98 | 01,20,30,16,28,13 | $0.78 | $1.00 |
| 1234564 | 2/10/98 | 02,30,21,26,24,01 | $0.10 | $1.00 |

135

| TOTAL REMAINING UNALLOCATED AMOUNT | $1.54 |
|---|---|

| ROUND UP AMOUNT | $0.35 |
|---|---|

← 130

120

| TICKET IDENTIFIER | DRAWING DATE | TICKET NUMBERS | UNALLOCATED PORTION | TICKET PRICE |
|---|---|---|---|---|
| 1234560 | 2/10/98 | 11,12,13,04,21,34 | $0.12 | $1.00 |
| 1234561 | 2/10/98 | 01,21,04,25,13,11 | $0.31 | $1.00 |
| 1234562 | 2/10/98 | 11,25,35,04,06,03 | $0.23 | $1.00 |
| 1234563 | 2/10/98 | 01,20,30,16,28,13 | $0.43 | $1.00 |
| 1234564 | 2/10/98 | 02,30,21,26,24,01 | $0.10 | $1.00 |

140

| TOTAL REMAINING UNALLOCATED AMOUNT | $1.19 |
|---|---|

FIG. 6

| TRANSACTION NUMBER 160 | POS TERMINAL IDENTIFIER 162 | PURCHASE PRICE 164 | ROUNDING MULTIPLE 165 | ROUND UP AMOUNT 166 | ACCEPTED OFFER FOR TICKET 168 | FREQUENT SHOPPER NUMBER 170 | DATE 172 | FRACTIONAL TICKET IDENTIFIER 174 |
|---|---|---|---|---|---|---|---|---|
| 7614234 | 1 | $16.88 | $1 | $0.12 | YES | 111111 | 2/10/98 | 1001 |
| 7614235 | 1 | $12.31 | $1 | $0.69 | YES | 111112 | 2/10/98 | 1002 |
| 7614236 | 2 | $13.23 | $5 | $1.77 | YES | 111113 | 2/10/98 | 1003 |
| 7614237 | 3 | $25.78 | $1 | $0.22 | YES | 111114 | 2/10/98 | 1004 |
| 7614238 | 2 | $31.10 | $10 | $8.90 | NO | 111115 | 2/10/98 | N/A |

| TICKET IDENTIFIER | DRAWING DATE | TICKET NUMBERS | UNALLOCATED PORTION | TICKET PRICE |
|---|---|---|---|---|
| 1234000 | 2/17/98 | 12,21,28, 35,38,40 | $0.55 | $1.00 |
| 1234001 | 2/17/98 | 5,15,25, 35,40,41 | $0.83 | $1.00 |
| 1234002 | 2/17/98 | 2,8,14, 26,39,42 | $0.95 | $1.00 |
| 123003 | 2/17/98 | 10,19,24, 29,36,39 | $0.61 | $1.00 |

202
204
206
208

| TOTAL REMAINING UNALLOCATED AMOUNT | $2.94 |
|---|---|

220

| ROUND UP AMOUNT | $0.60 |
|---|---|

FIG. 9

| DRAWING DATE 266 | WINNING TICKET NUMBERS 268 | PRIZE 270 |
|---|---|---|
| 1/7/98 | 02,03,12,16,21,25 | $1,000,000 |
| 1/14/98 | 03,04,16,21,22,24 | $2,000,000 |
| 1/21/98 | 01,02,03,04,11,06 | $1,500,000 |

FIG. 11

| FREQUENT SHOPPER NUMBER 288 | ADDRESS 290 | TELEPHONE 292 | NAME 294 | E-MAIL ADDRESS 296 |
|---|---|---|---|---|
| 111111 | 12 MAIN ST. ANYTOWN, USA | (111)456-7890 | SUSAN GREEN | - |
| 111112 | 456 RIVER DR. ANYTOWN, USA | (222)234-9876 | JONATHAN STEVENS | JSTEVENS@IBMI.COM |
| 111113 | 5412 MADISON AVE. ANYTOWN, USA | (333) 246-8108 | NANCY EVANS | - |
| 111114 | 99 PARK LA. ANYTOWN, USA | (444) 359-6129 | RALPH STEWART | - |

FIG. 12

METHOD AND APPARATUS FOR FACILITATING THE PLAY OF FRACTIONAL LOTTERY TICKETS UTILIZING POINT-OF-SALE TERMINALS

The present application is a continuation-in-part of U.S. patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997 and issued as U.S. Pat. No. 6,119,099 on Sep. 12, 2000, which is a continuation-in-part of U.S. patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997 and issued as U.S. Pat. No. 6,267,670 on Jul. 31, 2001, each of which are incorporated herein by reference.

CROSS-REFERENCE TO RELATED APPLICATIONS

The present invention is related to the following United States patent applications filed contemporaneously herewith:

U.S. patent application Ser. No. 09/045,084, entitled METHOD AND APPARATUS FOR CONTROLLING OFFERS THAT ARE PROVIDED AT A POINT-OF-SALE TERMINAL, filed on Mar. 20, 1998 and issued as U.S. Pat. No. 6,223,163 on Apr. 24, 2001, U.S. patent application Ser. No. 09/045,518, entitled METHOD AND APPARATUS FOR PROCESSING A SUPPLEMENTARY PRODUCT AT A POINT-OF-SALE TERMINAL, filed on Mar. 20, 1998 and issued as U.S. Pat. No. 7,072,850 on Jul. 4, 2006, U.S. patent application Ser. No. 09/045,386, entitled METHOD AND APPARATUS FOR CONTROLLING THE PERFORMANCE OF A SUPPLEMENTARY PROCESS AT A POINT-OF-SALE TERMINAL, filed on Mar. 20, 1998 and issued as U.S. Pat. No. 7,272,569 on Sep. 18, 2007, and U.S. patent application Ser. No. 09/045,347, entitled METHOD AND APPARATUS FOR PROCESSING A SUPPLEMENTARY PRODUCT SALE AT A POINT-OF-SALE TERMINAL, filed on Mar. 20, 1998 and now abandoned, each assigned to the assignee of the present invention and incorporated by reference herein.

FIELD OF THE INVENTION

The present invention relates to point-of-sale terminals, and more specifically to point-of-sale terminals that facilitate the purchase of lottery tickets.

BACKGROUND OF THE INVENTION

Lotteries are extremely popular games that generate significant revenues for sponsoring states that offer such games. In a typical lottery, a player (ticket holder) purchases a lottery ticket having ticket numbers and a serial number inscribed thereon. The ticket numbers allow both the ticket holder and a lottery agent to identify whether the ticket holder has won a prize. The serial number uniquely identifies the lottery ticket, and is typically recorded by a lottery agency so that the lottery ticket may be validated. For example, the serial number may be used to verify whether the ticket numbers inscribed on a ticket match those ticket numbers that the lottery agency has recorded as associated with that lottery ticket.

A typical lottery ticket has six ticket numbers, each selected from a range, such as the range of from one to forty-nine. The six ticket numbers may have been selected by the ticket holder or, at the request of the ticket holder, randomly selected by the lottery terminal printing the ticket. On a drawing date, the lottery agency randomly selects six ticket numbers, which are deemed "winning" ticket numbers. A lottery ticket having ticket numbers that match some or all of the winning ticket numbers is a winning ticket, and the corresponding holder of the lottery ticket wins a prize.

The grandparent application of the present application, patent application Ser. No. 08/822,709, entitled SYSTEM AND METHOD FOR PERFORMING LOTTERY TICKET TRANSACTIONS UTILIZING POINT-OF-SALE TERMINALS, filed on Mar. 21, 1997, discloses a system and method by which fractional lottery tickets may be sold to a customer at a point-of-sale ("POS") terminal in exchange for change due. For example, a customer may bring a purchase to a POS terminal, and the POS terminal may calculate the purchase price to be $4.74. If the purchase price is rounded to the nearest $1, the change due is $5.00−$4.74=$0.26. Accordingly, the customer may be sold a 26% share of a $1 lottery ticket in lieu of the change due. If the lottery ticket wins, 26% of the corresponding prize is awarded to the customer.

There are numerous advantages to providing a fractional lottery ticket in exchange for change due. As described in the parent application of the present application, patent application Ser. No. 08/920,116, entitled METHOD AND SYSTEM FOR PROCESSING SUPPLEMENTARY PRODUCT SALES AT A POINT-OF-SALE TERMINAL, filed on Aug. 26, 1997, dispensing and collecting coins is costly and burdensome. Furthermore, many customers consider coins to be dirty, and would prefer not to handle them. Thus, many customers will find the exchange of change due for a fractional lottery ticket to be very desirable.

Unfortunately, some state lottery agencies may be reluctant to change their practices by issuing lottery tickets for fractional amounts. Such state lottery agencies may instead prefer to offer tickets in only a few predetermined, rounded amounts, such as tickets for $1, $2 and $5 only. In some circumstances, the ability to offer fractional lottery tickets may require substantial modifications to the hardware and software of lottery terminals used throughout one or more states. Although such changes may ultimately be profitable, the initial cost may be perceived to be unduly burdensome, and the eventual profit to be made may appear too speculative. In summary, the issuance of fractional lottery tickets by state lottery agencies may not be practical in all circumstances.

Accordingly, it would be advantageous to facilitate the purchase of fractional lottery tickets without requiring significant changes in existing lottery systems.

SUMMARY OF THE INVENTION

It is an object of the present invention to facilitate the purchase of fractional lottery tickets without requiring significant changes to existing lottery systems.

In accordance with the present invention, a store controller determines a monetary value, such as an amount of spare change due to a customer, and allocates a portion of a lottery ticket for the customer based on the monetary value. The portion may be, for example, equal to the monetary value, or may be the monetary value rounded to the nearest nickel. The store controller outputs a ticket identifier that identifies the lottery ticket (e.g. a serial number) and a portion identifier that identifies the allocated portion of the lottery ticket (e.g. $0.34 of a $2.00 lottery ticket). Typically, the store controller outputs the identifiers to a POS terminal, which prints a fractional lottery ticket redeemable for a portion of the lottery ticket's prize. The store controller also stores the ticket identifier and the portion identifier, to assure that fraudulent tickets will be detected.

After a drawing date for the lottery ticket, the customer redeems the fractional lottery ticket, typically at a POS terminal, if a prize is due. The POS terminal communicates with the store controller, which receives the ticket identifier and the portion identifier therefrom. From the received identifiers, the store controller may determine a prize value of the corresponding lottery ticket. The customer is, in turn, provided with a portion of the prize value based on the allocated portion of the ticket.

BRIEF DESCRIPTION OF THE DRAWINGS

FIG. 5 is a schematic illustration of a ticket supply database of the store controller of FIG. 2.

FIG. 6 is a schematic illustration including exemplary data for the ticket supply database of FIG. 5.

FIG. 7 is a schematic illustration of a transaction database of the store controller of FIG. 2.

FIG. 9 is a schematic illustration including further exemplary data for the ticket supply database of FIG. 5.

FIG. 11 is a schematic illustration of a winning lottery ticket database of the store controller of FIG. 2.

FIG. 12 is a schematic illustration of a frequent shopper database of the store controller of FIG. 2.

DETAILED DESCRIPTION OF THE PREFERRED EMBODIMENTS

In accordance with the present invention, a business may acquire a lottery ticket, and allocate a portion of the lottery ticket to a customer. A share of any prize that is won with the lottery ticket is provided to the customer, the share of the prize corresponding to the allocated portion of the lottery ticket. For example, if a customer receives a $0.34 portion of a $2.00 lottery ticket, then the customer receives 17% ($0.34/$2.00=17%) of the prize derived from the lottery ticket. A portion of a lottery ticket may be expressed as a monetary value, such $0.34, and may be expressed as a percentage, such as 17%.

Typically, the business will acquire a group of lottery tickets and allocate portions of those lottery tickets to customers as needed. The prizes derived from the group of lottery tickets are received by the business, which in turn pays shares of the prizes to customers based on the allocated portions. Since the business need only purchase conventional lottery tickets, the business may facilitate the play of fractional lottery tickets without requiring significant changes in existing lottery agency practices.

The portion of the lottery ticket allocated to the customer may be based on a change amount that is due in connection with a transaction at a POS terminal. Such an embodiment is advantageous since many customers will welcome an alternative to receiving change. Moreover, receiving something having a high perceived value, such as a fractional lottery ticket, instead of change can be even more attractive to customers.

Figure 1:
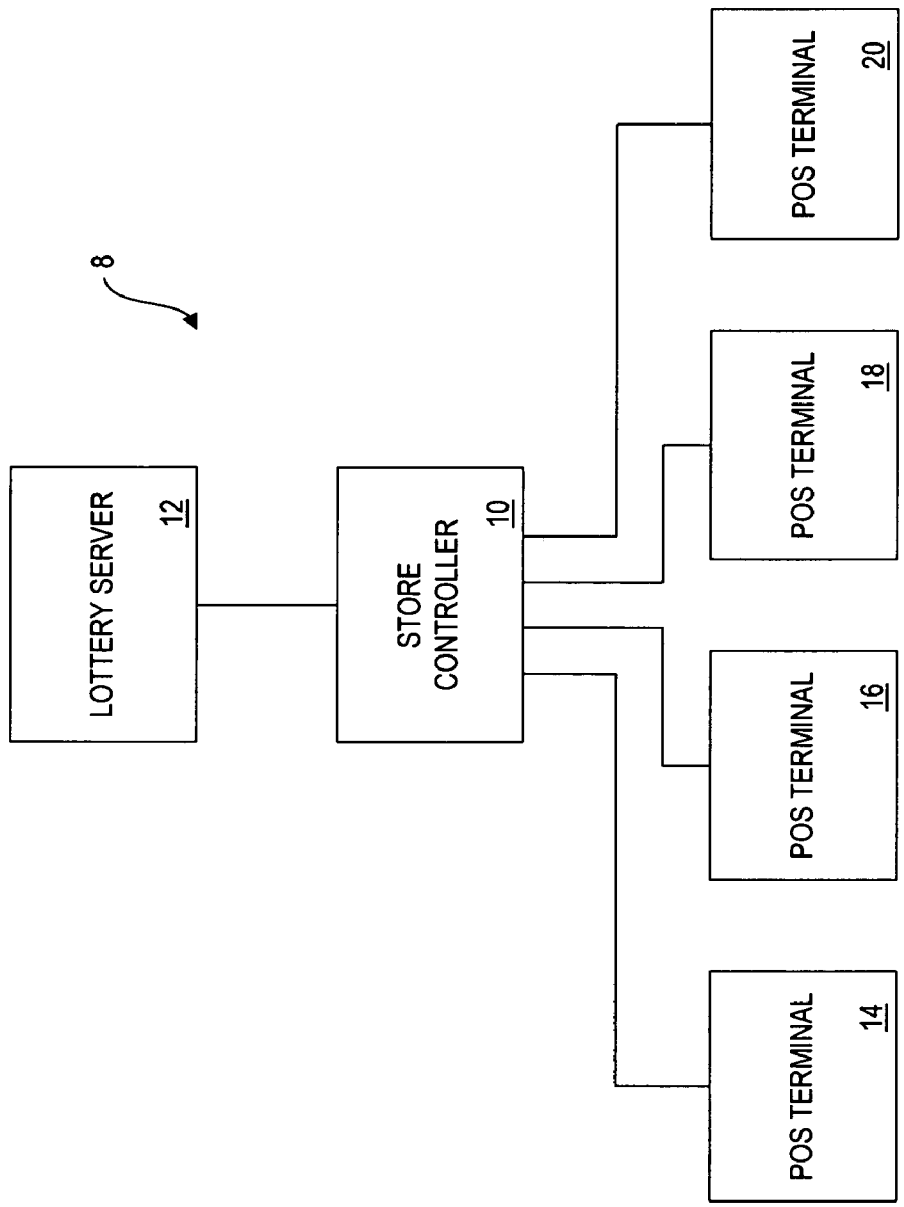
FIG. 1 is a schematic illustration of a network of POS terminals provided in accordance with the present invention.

Referring to FIG. 1, a network 8 comprises a store controller 10, which is in communication with a lottery server 12 and with POS terminals 14, 16, 18 and 20. The POS terminals 14, 16, 18 and 20, which are typically cash registers or other terminals, may initiate and/or complete fractional lottery ticket transactions. Although four POS terminals are shown in FIG. 1, any number of POS terminals may be in communication with the store controller 10. The POS terminals 14, 16, 18 and 20 may be located in the same store, in different stores of a chain of stores, or in other locations.

The store controller 10 directs the operation of, stores data from and transmits data to the POS terminals 14, 16, 18 and 20. The store controller 10 may itself be a POS terminal or may be another computing device that can communicate with one or more POS terminals. The lottery server 12 is typically controlled by a state lottery agency, and responds to requests from the store controller 10. For example, the lottery server 12 may issue lottery tickets as requested by the store controller 10, and may provide the winning numbers for a drawing date.

Figure 2:
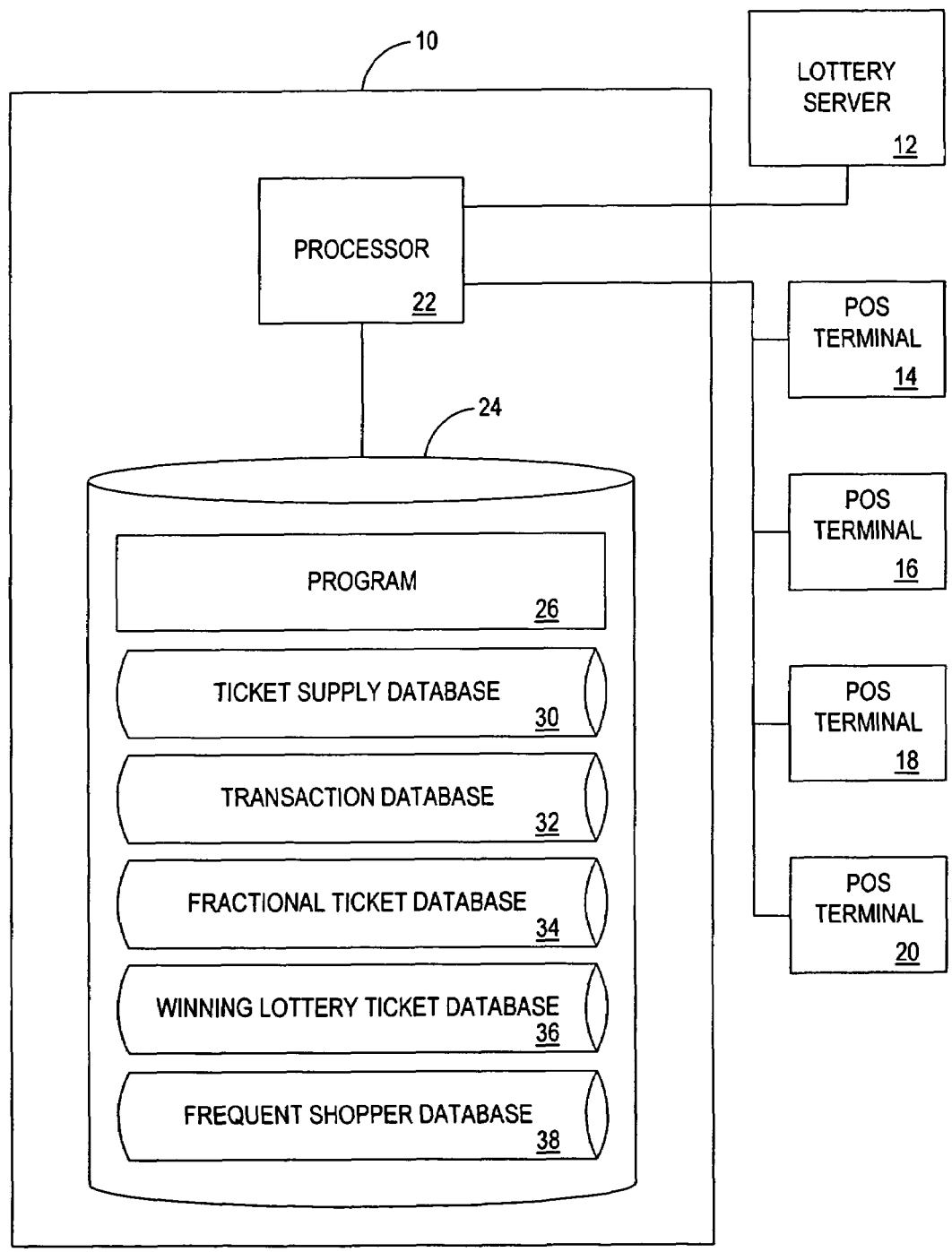
FIG. 2 is a schematic illustration of a store controller of the network of FIG. 1.

Referring to FIG. 2, the store controller 10 of FIG. 1 comprises a processor 22, such as one or more conventional microprocessors. The processor 22 is in communication with a data storage device 24, such as an appropriate combination of magnetic, optical and/or semiconductor memory. The processor 22 and the storage device 24 may each be (i) located entirely within a single computer or other computing device; (ii) connected to each other by a remote communication link, such as a serial port cable, telephone line or radio frequency transceiver; or (iii) a combination thereof. For example, the store controller 10 may comprise one or more computers that are connected to a remote server computer for maintaining databases.

The storage device 24 stores a program 26 for controlling the processor 22. The processor 22 performs instructions of the program 26, and thereby operates in accordance with the present invention, and particularly in accordance with the methods described in detail herein. The program 26 furthermore includes program elements that may be necessary, such as an operating system and "device drivers" for allowing the processor 22 to interface with computer peripheral devices. Appropriate device drivers and other necessary program elements are known to those skilled in the art, and need not be described in detail herein.

The storage device 24 also stores (i) a ticket supply database 30; (ii) a transaction database 32; (iii) a fractional ticket database 34; (iv) a winning lottery ticket database 36; and (v) a frequent shopper database 38. The databases 30, 32, 34, 36 and 38 are described in detail below and depicted with exemplary entries in the accompanying figures. As will be understood by those skilled in the art, the schematic illustrations of and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Figure 3:
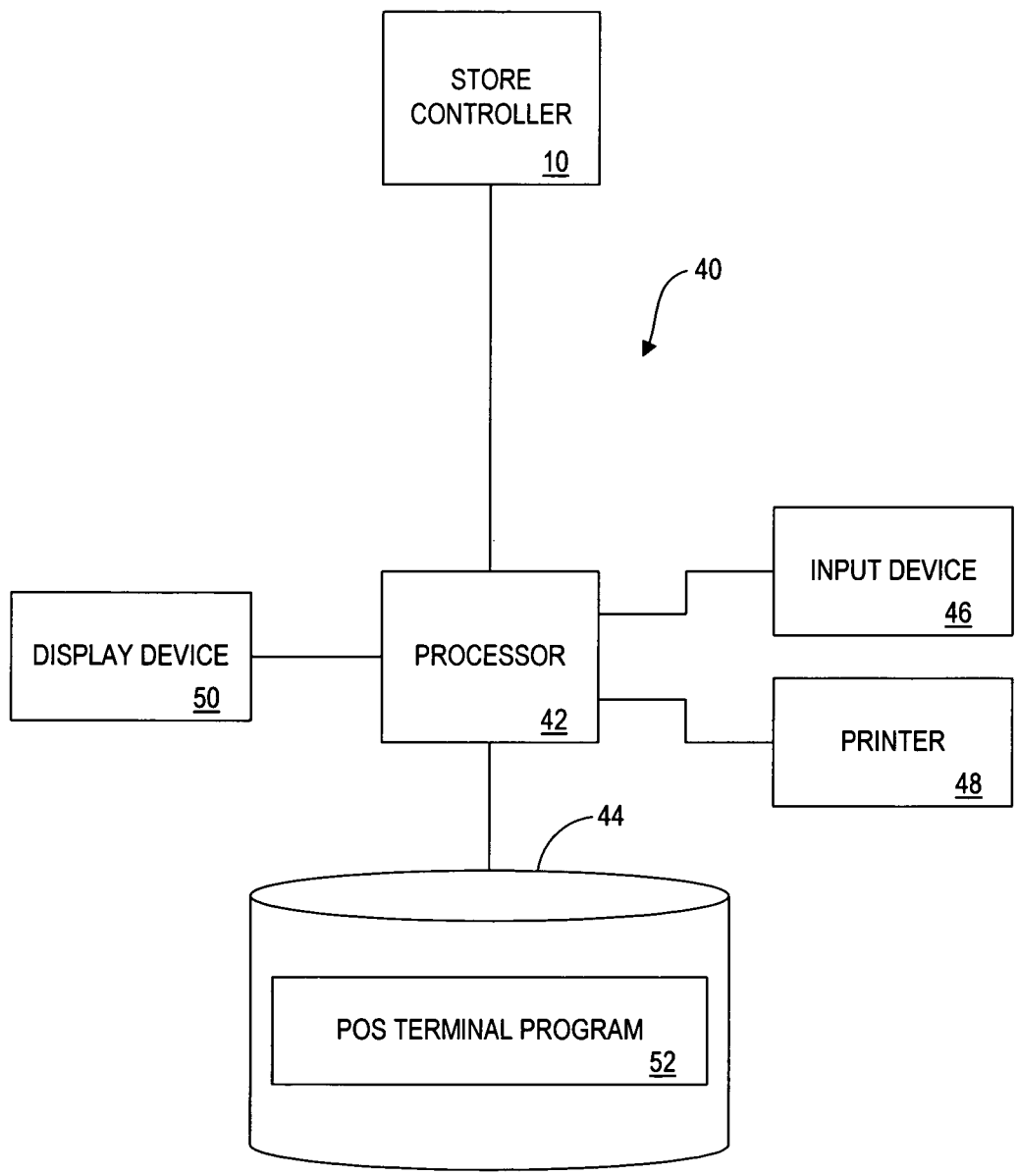
FIG. 3 is a schematic illustration of a POS terminal of the network of FIG. 1.

Referring to FIG. 3, a schematic illustration of a POS terminal 40 is descriptive of the POS terminals 14, 16, 18 and 20 of FIG. 1. The POS terminal 40 comprises a processor 42, such as one or more conventional microprocessors. The processor 42 is in communication with a data storage device 44, such as an appropriate combination of magnetic, optical and/or semiconductor memory. The processor 42 and the storage device 44 may each be (i) located entirely within a single computer or other computing device; (ii) connected to each other by a remote communication link, such as a serial port cable, telephone line or radio frequency transceiver; or (iii) a combination thereof. For example, the POS terminal 40 may comprise one or more computers which are connected to a remote server computer for maintaining databases.

An input device 46, a printer 48 and a display device 50 are each in communication with the processor 42. The input device 46 preferably comprises a keypad for transmitting input signals, such as signals indicative of a purchase, to the processor 42. The input device 46 may also comprise an optical bar code scanner for reading bar codes and transmitting signals indicative of those bar codes to the processor 42. The printer 48 is for registering indicia on paper or other material, thereby printing fractional lottery tickets as commanded by the processor 42. The display device 50 is preferably a video monitor for displaying at least alphanumeric characters to the customer and/or a cashier operating the POS terminal 40. Many types of input devices, printers and display devices are known to those skilled in the art, and need not be described in detail herein.

The storage device 44 stores a POS terminal program 52 for controlling the processor 42. The processor 42 performs instructions of the POS terminal program 52, and thereby operates in accordance with the present invention, and particularly in accordance with the methods described in detail herein. The POS terminal program 52 furthermore includes program elements that may be necessary, such as an operating system and "device drivers" for allowing the processor 42 to interface with computer peripheral devices, such as the input device 46, the printer 48 and the display device 50. Appropriate device drivers and other necessary program elements are known to those skilled in the art, and need not be described in detail herein.

Figure 4:
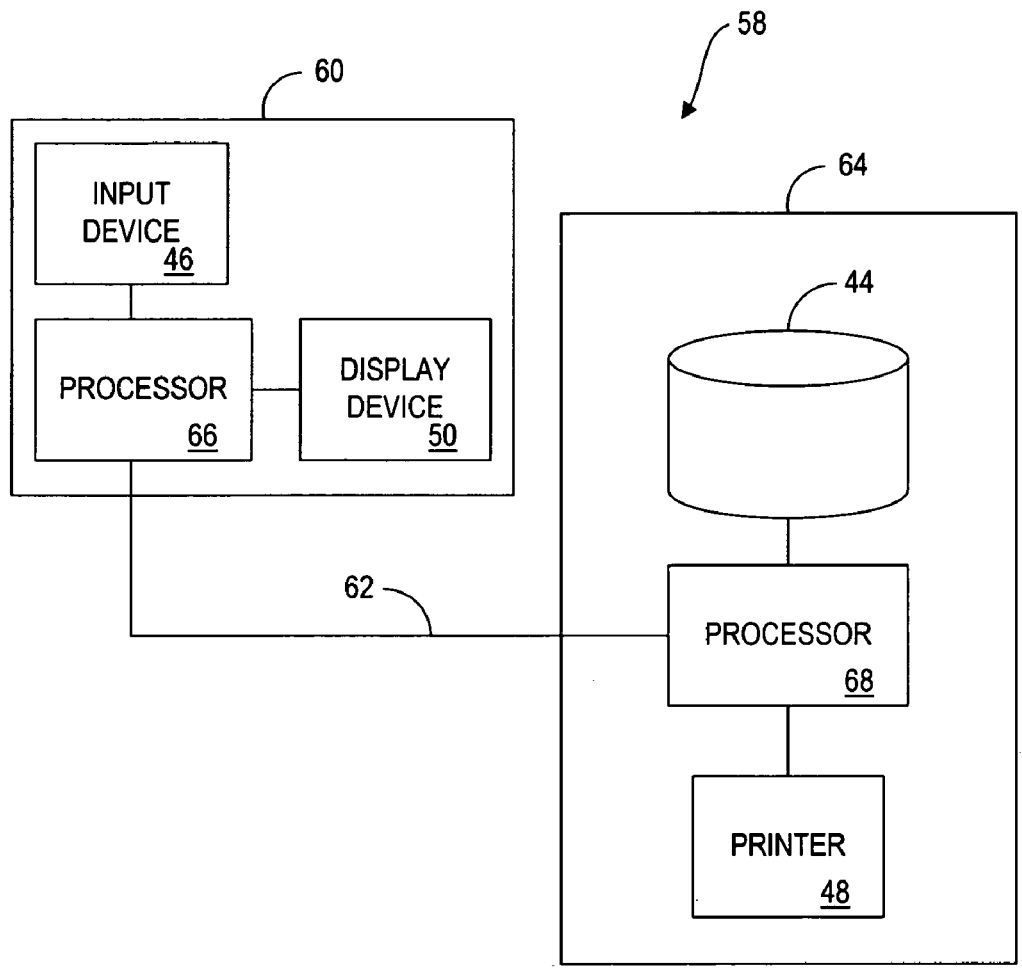
FIG. 4 is a schematic illustration of an alternate embodiment of a POS terminal of the network of FIG. 1.

FIG. 4 illustrates an alternate embodiment of a POS terminal 58, which is descriptive of the POS terminals 14, 16, 18 and 20 of FIG. 1. A control device 60 is in communication via a communication medium 62 with a system 64 for printing fractional lottery tickets, receipts and/or coupons. The control device 60 comprises a processor 66 that is in communication with the input device 46 (FIG. 3) and the display device 50 (FIG. 3). The system 64 for printing comprises a processor 68 in communication with the storage device 44 (FIG. 3) and the printer 48 (FIG. 3). In this embodiment, the control device 60 may be a cash register, and the system 64 may be an electronic device for printing tickets in accordance with data received from the cash register. Other configurations of the POS terminal 40 will be understood by those skilled in the art.

The description that follows is arranged into the following sections: Allocating Portions of Lottery Tickets, Acquiring Additional Lottery Tickets, and Redeeming Portions of Lottery Tickets.

Allocating Portions of Lottery Tickets

Referring to FIG. 5, the ticket supply database 30 of FIG. 2 includes rows 80, 82, 84, 86 and 88, each of which represents an entry of the ticket supply database 30. Each entry defines a lottery ticket that is to be allocated, in which the allocated portions of the lottery ticket are included in fractional lottery tickets. In particular, each entry includes (i) a ticket identifier 90 that uniquely identifies the entry, such as a serial number of the lottery ticket or a portion of the serial number; (ii) a drawing date 92 that indicates when winning ticket numbers will be announced; (iii) ticket numbers 94; (iv) an unallocated portion 96 of the lottery ticket; and (v) a ticket price 98, which indicates the total of the unallocated portion 96 and any allocated portions. For any entry, the unallocated portion 96 and the ticket price 98 may be used to determine how much of the corresponding lottery ticket has been allocated. For example, referring to the entry 84, of the $1.00 ticket price, $0.23 remains unallocated. Accordingly, $0.77 ($1.00−$0.23) has been allocated. A total remaining unallocated amount 100 indicates the sum of the unallocated portions of all lottery tickets. Given the exemplary data shown in FIG. 4, the total remaining unallocated amount 100 is $1.54 ($0.12+$0.31+$0.23+$0.78+$0.10=$1.54).

Referring to FIG. 6, exemplary data for the ticket supply database 30 (FIGS. 2 and 5) are shown before and after a portion of a lottery ticket has been allocated. The table 110 represents the ticket supply database 30 before a transaction represented by a round-up amount 130. The table 120 represents the ticket supply database 30 after the transaction represented by the round-up amount 130. The round-up amount 130 has a value of $0.35, and corresponds to a transaction where a customer exchanges his change due ($0.35) for a fractional lottery ticket. The customer thus obtains a portion of a lottery ticket, and the portion is based on the monetary amount $0.35.

As described above, each of the entries shown in the table 110 corresponds to a ticket. Except for the entry 135, the monetary amount $0.35 is greater than the unallocated portions of every entry. By contrast, the entry 135 has an unallocated portion of $0.78, and thus a $0.35 portion of the corresponding lottery ticket may be allocated therefrom. Accordingly, the lottery ticket corresponding to the entry 135 is selected, and a portion corresponding to $0.35 is allocated to make a new fractional lottery ticket.

The entry 135 represents the ticket "1234563" before the $0.35 portion is allocated therefrom. An entry 140 of the table 120 represents the ticket "1234563" after the $0.35 portion is allocated therefrom. The unallocated portion of the entry 140 is $0.43, which is the original $0.78 unallocated portion reduced by $0.35. Similarly, before the transaction represented by the round-up amount 130, the total remaining unallocated amount (of all lottery tickets) is $1.54. After the transaction, the total remaining unallocated amount is $1.19, which is $1.54 reduced by $0.35.

Referring to FIG. 7, the transaction database 32 of FIG. 2 includes rows 150, 152, 154, 156 and 158, each of which represents an entry of the transaction database 32. Each entry defines a transaction initiated by a POS terminal. In particular, each entry includes (i) a transaction number 160 that uniquely identifies the transaction; (ii) a POS terminal identifier 162 that uniquely identifies the POS terminal initiating the transaction; (iii) a purchase price 164; (iv) a rounding multiple 165 that is used to indicate an amount to which the purchase price is to be rounded; (v) a round-up amount 166 that is the monetary amount used to purchase the fractional lottery ticket; (vi) an indication of whether the offer for a fractional lottery ticket was accepted 168; (vii) a frequent shopper number 170 identifying a customer who has used a frequent shopper card for the transaction; (viii) a date 172 of the transaction; and (ix) a fractional ticket identifier 174 that identifies a fractional lottery ticket provided in exchange for the round-up amount.

The round-up amount 166 is the monetary amount used to purchase the fractional lottery ticket. In some embodiments, round-up amount 166 is equal to the allocated portion of a lottery ticket. For example, a customer may have $0.62 in change (the round-up amount) from a purchase, and use that change to acquire a $0.62 portion of a lottery ticket. However, the monetary amount used to purchase the fractional lottery ticket need not be equal to the allocated portion of the corresponding lottery ticket. In certain embodiments, the allocated portion of a lottery ticket is based on a rounded-down (or rounded-up) monetary amount. For example, a customer may have $0.62 in change from a purchase, and use that change to acquire a fractional lottery ticket. The fractional lottery ticket may be based on an allocated $0.60 ($0.62 rounded down to the nearest nickel) portion of a lottery ticket. Of course, the monetary amount may be rounded down to other multiples, such as to the nearest dime, quarter or dollar, and that rounded amount would define the allocated portion of a lottery ticket. The difference between the change due and the rounded-down amount upon which the fractional lottery ticket is based may, for example, be kept as a service fee by the seller of the fractional lottery ticket.

The allocated portion of a lottery ticket may be based on the monetary amount in still further ways. For example, the allocated portion may be double the monetary amount. It may be advantageous to provide such a double-value allocated portion if a customer buys a predetermined good or type of good, or if the customer uses a frequent shopper card. For example, if a customer has $0.62 in change and purchases a product of a particular manufacturer, the customer receives a fractional lottery ticket that is based on an allocated $1.24 (double $0.62) portion of one or more lottery tickets in exchange for his change.

Figure 8:
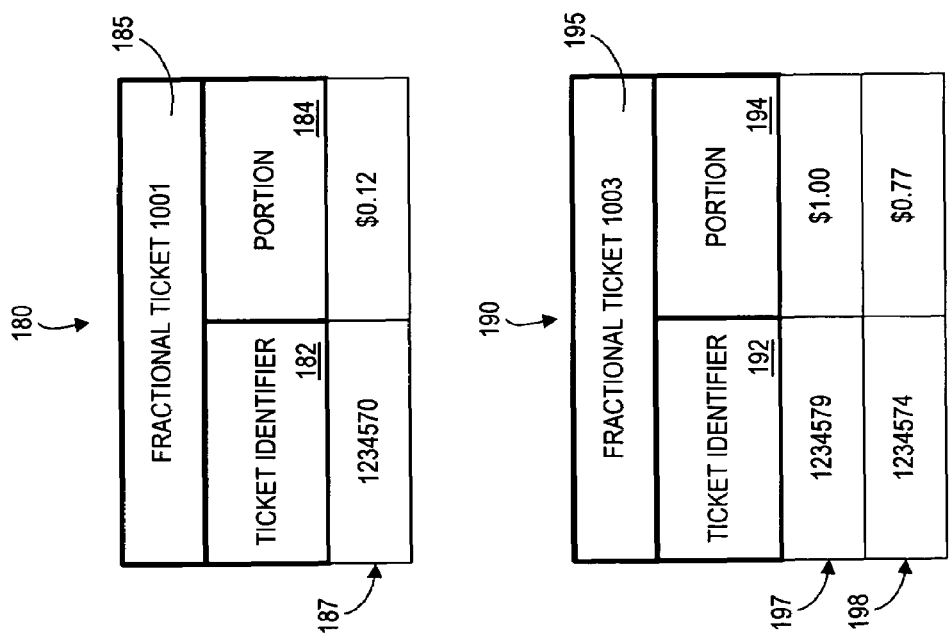
FIG. 8 is a schematic illustration of records of a fractional ticket database of the store controller of FIG. 2.

Referring to FIG. 8, tables 180 and 190 represent records of the fractional ticket database 34 (FIG. 2). Typically, the fractional ticket database 34 includes a plurality of records such as those represented by the table 180 and 190. Each record of the fractional ticket database 34 defines a fractional lottery ticket, and each fractional lottery ticket includes allocated portions of one or more lottery tickets.

The record represented by the table 180 defines a fractional lottery ticket that is identified by an identifier 185 (the identifier "1001"). The table 180 includes an entry 187, which defines a portion of a lottery ticket that is included in the fractional lottery ticket "1001". The entry 187 includes (i) a ticket identifier 182 that uniquely identifies the lottery ticket; and (ii) a portion 184 indicating a portion of the lottery ticket that is included in the fractional lottery ticket "1001".

Similarly, the record represented by the table 190 defines a fractional lottery ticket that is identified by an identifier 195 (the identifier "1003"). The table 190 includes entries 197 and 198, which each include (i) a ticket identifier 192; and (ii) a portion 194. Since the fractional lottery ticket "1003" includes portions from more than one lottery ticket, the fractional lottery ticket "1003" may include allocated amounts which collectively exceed the maximum price of one lottery ticket.

As described above, a fractional lottery ticket includes portions of one or more lottery tickets. In certain embodiments, the lottery tickets are not chosen by the customer, but are instead chosen automatically by the POS terminal or store controller 10 (FIG. 1). In such embodiments, a lottery ticket is selected from the plurality of lottery tickets in the ticket supply database 30 (FIG. 2). The lottery ticket may be selected in several ways. For example, a lottery ticket having an unallocated portion at least as great as the monetary value may be selected. Similarly, a set of lottery tickets that each have an unallocated portion at least as great as the monetary value may be determined. From this set, the lottery ticket which has a minimal unallocated portion is selected. The description below further clarifies this method of selecting a lottery ticket.

Referring to FIG. 9, a table 200 illustrates exemplary data for the ticket supply database 30 (FIGS. 2 and 5). The table 200 includes entries 202, 204, 206 and 208. A round-up amount 220 has a value of $0.60, and corresponds to a transaction where a customer exchanges his change due ($0.60) for a fractional lottery ticket. The customer thus obtains a portion of a lottery ticket, and the portion is based on the monetary amount $0.60. To select the lottery ticket from which to allocate a portion, the store controller 10 determines a set of tickets that each have an unallocated portion of at least $0.60. This set includes the entries 204, 206 and 208. From this set, the lottery ticket which has a minimal unallocated portion is selected. Of the entries 204, 206 and 208, the entry 208 has the minimal unallocated portion ($0.61). Accordingly, the lottery ticket corresponding to the entry 208 is selected, and a $0.60 portion is allocated therefrom.

In other embodiments, the customer may select the ticket numbers himself at the time of the transaction, either manually or through numbers stored on a frequent shopper card. One or more lottery tickets that include those ticket numbers would be acquired (e.g., by electronic request to the lottery server 12), added to the ticket supply database 30 (FIG. 2), and one or more portions thereof would be included in the fractional lottery ticket purchased by the customer. Such an embodiment allows a customer to obtain a fractional lottery ticket having his favorite or "lucky" numbers.

Once a fractional lottery ticket has been determined, the POS terminal prints for the customer a ticket indicative of the fractional lottery ticket, for example, on a receipt. The printed ticket serves as proof that the customer is entitled to the indicated portions of any prizes won by the indicated lottery tickets. Such a printed ticket may include the =corresponding (i) fractional lottery ticket identifier, (ii) ticket numbers, (iii) allocated portion(s) of the lottery ticket(s), (iv) transaction identifier, and (v) an encrypted code based on a combination thereof. Such an encrypted code may be used to verify that the printed ticket is unaltered. Encryption techniques are described in "Applied Cryptography: Protocols, Algorithms and Source Code in C, Second Edition", by Bruce Schneier, published 1996. Those skilled in the art will understand that the encrypted code will be determined by a cryptographic algorithm such that it would be almost impossible for a forger to generate a valid code, much less a code that indicates a winning lottery ticket.

The printed ticket may also include contractual language, such as provisions assigning to the customer the right and title in and to the indicated portions of any prizes won by the indicated lottery tickets. Still further matter such as the drawing date and an expiration date of the fractional lottery ticket may be included on the printed ticket, as will be understood by those skilled in the art. It may be further desirable to print a bar code that indicates any or all of the above information, thereby facilitating entry of the information using a bar code scanner.

Figure 10:
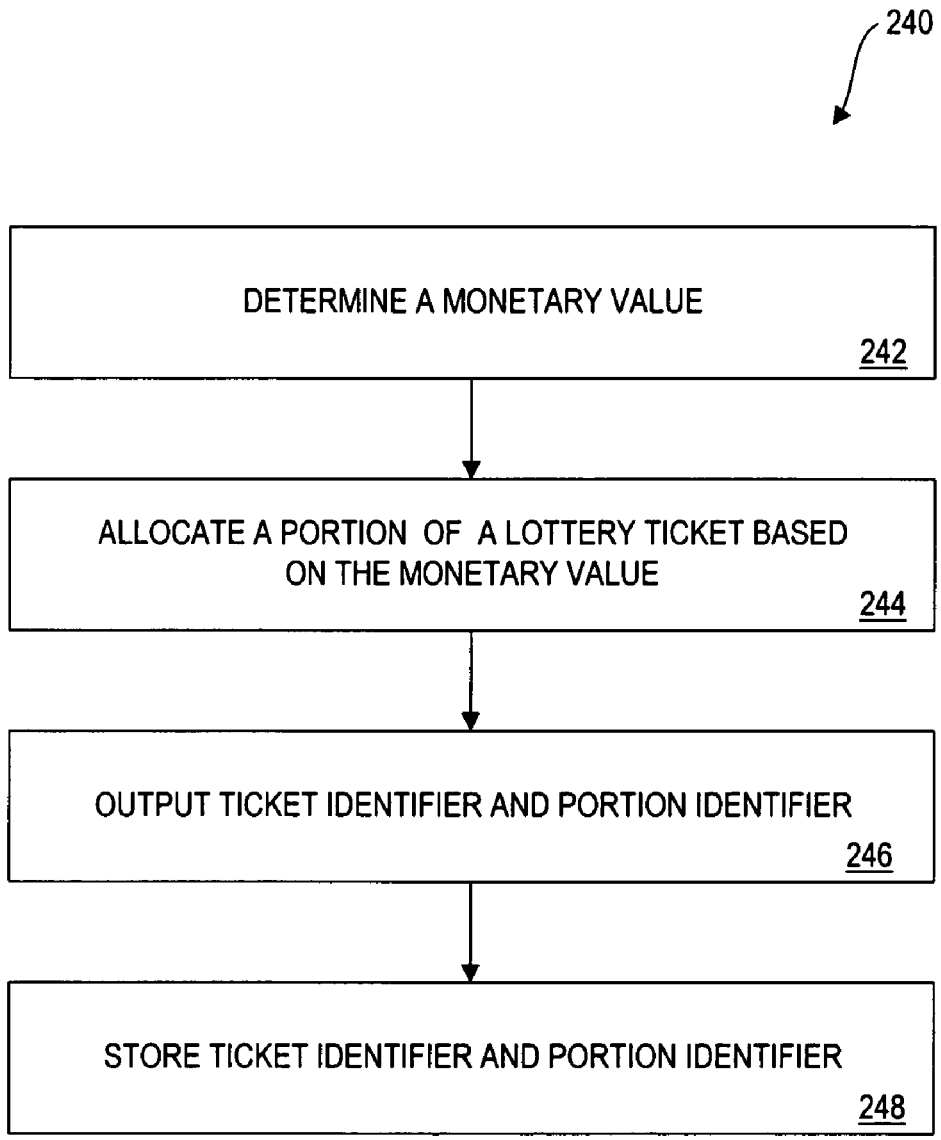
FIG. 10 is a flow chart illustrating a method for allocating portions of lottery tickets.

Referring to FIG. 10, a method 240 for allocating portions of lottery tickets initiates by determining a monetary value (step 242). For example, a POS terminal may calculate an amount of change due and round this amount down to the nearest dime. The POS terminal transmits the rounded amount to the store controller, and the store controller thereby determines the monetary value to be this rounded amount. The store controller in turn allocates a portion of a lottery ticket, the portion being based on the monetary value (step 244). The store controller then outputs (i) a ticket identifier that identifies the lottery ticket, and (ii) a portion identifier that identifies the allocated portion of the lottery ticket (step 246). For example, the store controller typically transmits the ticket identifier and the portion identifier to the POS terminal, and the POS terminal in turn prints a fractional lottery ticket based on the transmitted identifiers, as described above. The store controller also stores the ticket identifier and the portion identifier (step 248), for example, in the fractional ticket database 34 (FIG. 2), for authentication purposes.

Acquiring Additional Lottery Tickets

As described above, portions of lottery tickets from the supply of lottery tickets are allocated. After an allocation, it is possible that a lottery ticket will have an unallocated portion of $0.00. In other words, the entire lottery ticket will have been allocated, and no further portions of the lottery ticket remain to be allocated.

In addition, after an allocation, it is possible that no single lottery ticket has an unallocated portion which is sufficient to satisfy a particular request (or an anticipated request) for a fractional lottery ticket. For example, there may be an attempt to allocate a $0.35 portion of a lottery ticket, yet no lottery ticket represented in the ticket supply database 30 (FIG. 2) has an unallocated portion of $0.35 or more. In such a situation, it may be possible to allocate portions from a plurality of lottery tickets, such that the portions collectively equal $0.35. However, it may be desirable to allocate a portion from a single lottery ticket, rather than from many. For example, it is simpler for a customer to track one set of ticket numbers, rather than a plurality of sets of ticket numbers.

Accordingly, it is advantageous to acquire additional lottery tickets for the supply of lottery tickets. It is particularly advantageous to acquire additional lottery tickets at a time before the lottery tickets are needed, so as not to introduce undue delays into a transaction. Additional tickets may be acquired in predetermined amounts to reduce time spent acquiring lottery tickets. For example, thirty tickets may be acquired at once. In addition, the predetermined amount may depend on criteria such as the number of POS terminals in use. Additional lottery tickets may be acquired by purchasing "quick pick" tickets (Tickets with randomly selected ticket numbers) from the state lottery in a known manner.

In one embodiment, the store controller 10 (FIG. 1) counts the number of tickets that have an unallocated portion that is above a first predetermined threshold. For example, the store controller 10 may count the number of tickets that have an unallocated portion that is above $0.50. This number is compared with a second predetermined threshold, and one or more additional lottery tickets are acquired if this number is below the second predetermined threshold. For example, if there are less than ten lottery tickets having unallocated portions above $0.50, additional lottery tickets are acquired.

In another embodiment, the store controller 10 (FIG. 1) counts the number of tickets that have an unallocated portion that is above a requested portion. For example, a POS terminal may request a $0.40 fractional lottery ticket from the store controller. The store controller 10 then counts the number of tickets that have an unallocated portion that is above $0.40. This number is compared with a predetermined threshold, and one or more additional lottery tickets are acquired if this number is below the predetermined threshold. For example, if there are less than eight lottery tickets having unallocated portions above $0.40, additional lottery tickets are acquired.

In another embodiment, the store controller 10 (FIG. 1) calculates the sum of the unallocated portions of all tickets. If the sum is below a predetermined threshold, additional tickets are acquired. For example, if the total remaining unallocated amount is below $10.00, a block of thirty additional tickets are acquired.

Redeeming Portions of Lottery Tickets

The business or other entity acquiring and maintaining the supply of lottery tickets may check each to determine whether any are winning tickets. If so, the business preferably redeems the winning tickets for prizes as soon as practical, so that the prizes may be used to pay those customers that have corresponding fractional lottery tickets. Winning ticket numbers may be entered manually into the store controller 10 (FIG. 1) when available. Ideally, the store controller 10 will receive from the lottery server 12 (FIG. 1) the winning ticket numbers for each drawing date. The store controller can store these winning ticket numbers in the winning lottery ticket database 36 (FIG. 2).

Referring to FIG. 11, the winning lottery ticket database 36 includes entries 260, 262 and 264, each defining winning ticket numbers for a drawing date. Each entry includes (i) a corresponding drawing date 266, (ii) winning ticket numbers 268, and (iii) a prize 270. The winning lottery ticket database 36 should include entries for all drawing dates corresponding to valid and redeemable fractional lottery tickets. For example, if fractional lottery tickets may be redeemed up to one year after the corresponding drawing date, then the entries for each drawing date of at least the past year should be stored. The prize 270 may be, for example, the prize won upon matching all winning ticket numbers. More prizes may be specified for each entry. For example, a prize for matching only five of six winning ticket numbers may be specified for each entry as well.

When winning ticket numbers for a drawing date are received by the store controller 10 (FIG. 1), the store controller 10 may simply store them in the winning lottery ticket database 36, where they are accessed when fractional lottery tickets are redeemed by customers. However, the store controller 10 may also determine which fractional lottery tickets include portions of a winning lottery ticket. Then the corresponding records of the fractional ticket database 34 (FIG. 2) may be modified to indicate that the fractional lottery tickets include portions of winning lottery tickets. In addition, if those fractional lottery tickets were purchased using frequent shopper cards, then the corresponding customer may be notified.

Referring to FIG. 12, the frequent shopper database 38 includes entries 280, 282, 284 and 286, each defining a frequent shopper (a customer who has used a frequent shopper card for the transaction). In particular, each entry includes (i) a frequent shopper number 288 for uniquely identifying the frequent shopper; (ii) an address 290 of the frequent shopper; (iii) a telephone number 292 of the frequent shopper; (iv) a name 294 of the frequent shopper; and (v) an email address 296 of the frequent shopper. With such stored information, frequent shoppers may be notified by mail, telephone call, email or other forms of notification as desired. In addition, frequent shoppers may be notified by the POS terminal when they next use their frequent shopper card. Providing frequent shopper with the additional benefit of notification is advantageous because it may prompt customers to become frequent shoppers. Consequently, these customers are more likely to continue frequenting the corresponding business.

To redeem a fractional lottery ticket, a customer preferably provides the printed ticket to show that he is entitled to the indicated share of the prize. The printed ticket is verified to assure that it is valid and unaltered. For example, if the printed ticket is valid, the fractional lottery ticket identifier inscribed on the printed ticket indicates a record in the fractional ticket database. That record should in turn indicate corresponding information on the printed ticket. In addition, the encrypted code can be verified.

Figure 13:
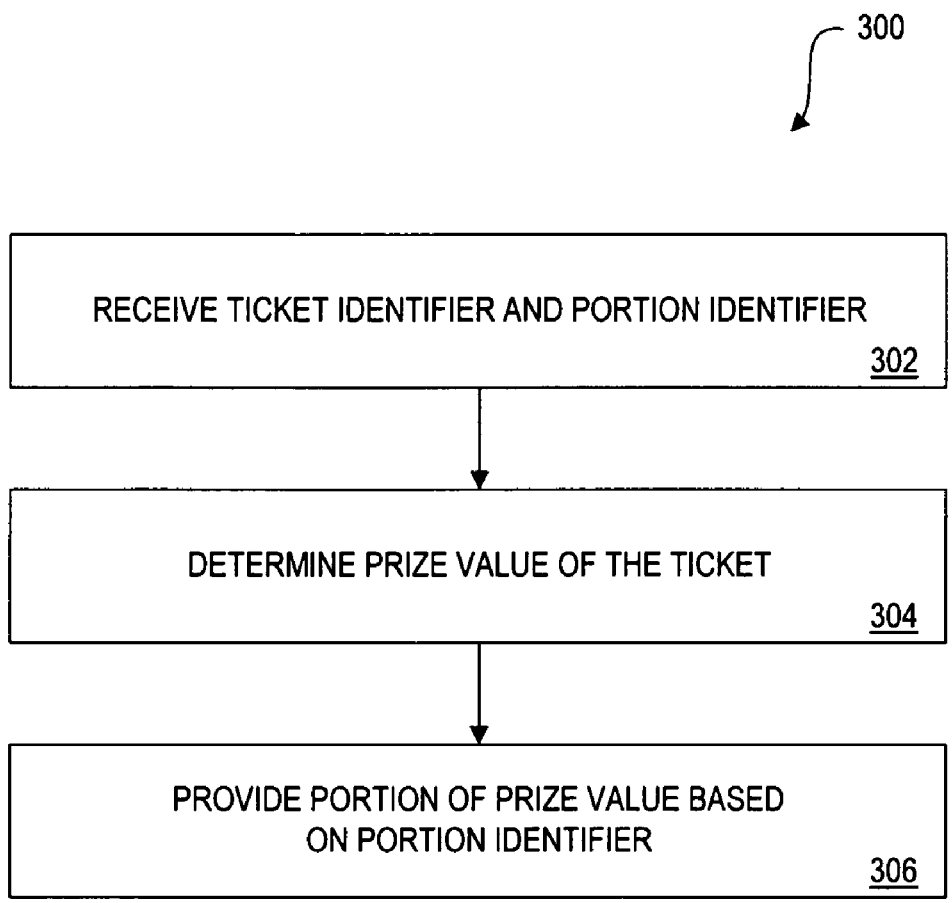
FIG. 13 is a flow chart illustrating a method for redeeming a fractional lottery ticket.

Referring to FIG. 13, a method 300 for redeeming a fractional lottery ticket initiates by receiving (i) a ticket identifier that identifies a lottery ticket, and (ii) a portion identifier that identifies an allocated portion of the lottery ticket (step 302). Such identifiers may be received by manually entering one or more identifiers into a POS terminal, from which the identifiers are transmitted to the store controller 10 (FIG. 1). Alternatively, a bar code scanner of the POS terminal may read a bar code on the printed ticket, and transmit the bar code to the store controller 10. The entered identifier or bar code may be indicative of the fractional lottery ticket identifier, which may be used to retrieve a corresponding ticket identifier and portion identifier from the fractional ticket database 34 (FIG. 2). The store controller thus receives the ticket identifier and portion identifier.

Once the identifiers are received, thereby identifying one or more lottery tickets and allocated portions thereof, a prize value of the lottery tickets is determined (step 304). As discussed above, the prize value may be determined by comparing ticket numbers of a lottery ticket with winning ticket numbers stored in the winning lottery ticket database 36 (FIG. 2). As also described above, the portion of the prize that is to be provided to the customer is determined by the allocated portion of the lottery ticket. This portion of the prize is provided to the customer (step 306), typically by providing cash from a cash register or by writing or printing a check made out to the customer.

A winning lottery ticket may have an unallocated portion greater than zero. Such a winning lottery ticket will have an associated portion of the prize value that is not to be paid to customers. This portion of the prize is instead retained by the business, and may be used to finance various customer incentives. For example, a portion of retained prize value may be provided back to customers in the form of fractional lottery tickets (e.g., $0.05 of change buys a $0.50 fractional lottery ticket).

The business may retain further winnings by providing winning tickets with portions of certain prize values. For example, customers may only be provided with shares of "jackpot" prizes (e.g. matching all six winning ticket numbers). Any other prizes are retained by the business. Of course, such restrictions would typically be explained to the customers through advertising and printed information on the fractional lottery ticket.

Although the present invention has been described with respect to a preferred embodiment thereof, those skilled in the art will note that various substitutions may be made to those embodiments described herein without departing from the spirit and scope of the present invention. For example, the present invention is applicable to many types of games besides lotteries in which prizes are awarded. In addition, in some embodiments the data stored on the store controller may instead be stored among the POS terminals. Similarly, some of the functions performed by the store controller may be performed by the POS terminal, and vice versa.

What is claimed is:

1. A method for facilitating the purchase of fractional lottery tickets using a point-of-sale terminal, comprising:
    using a point-of-sale terminal to determine a monetary value based on an amount of change due for a purchase;
    allocating a portion of a ticket, the portion being based on the monetary value,
        in which the ticket is associated with a predetermined price, and
        in which the predetermined price is greater than the monetary value;
    outputting a ticket identifier that identifies the ticket and a portion identifier that identifies the allocated portion of the ticket; and
    storing the ticket identifier and the portion identifier.

2. The method of claim 1, further comprising:
    selecting the ticket from a plurality of tickets.

3. The method of claim 2, in which the step of selecting the ticket from a plurality of tickets comprises:
    selecting a ticket having an unallocated portion at least as great as the monetary value.

4. The method of claim 2, in which the step of selecting the ticket from a plurality of tickets comprises:
    determining a set of tickets that each have an unallocated portion at least as great as the monetary value; and
    selecting a ticket from the set of tickets which has a minimal unallocated portion.

5. The method of claim 1, in which the step of determining a monetary value based on an amount of change due for a purchase comprises:
    rounding the amount of change due to a predetermined multiple, thereby generating a rounded change amount; and
    setting the monetary value equal to the rounded change amount.

6. The method of claim 5, in which the step of rounding the amount of change due comprises:
    rounding down the amount of change due to a predetermined multiple, thereby generating a rounded-down change amount.

7. The method of claim 1, further comprising:
    outputting an offer to exchange a fractional lottery ticket for change due.

8. The method of claim 1, further comprising:
    determining a prize value of the ticket; and
    determining a portion of the prize value based on the allocated portion of the ticket.

9. The method of claim 1, further comprising:
    determining a prize value of the ticket; and
    providing a portion of the prize value based on the allocated portion of the ticket.

10. The method of claim 1, further comprising:
    maintaining a supply of tickets, each ticket having an unallocated portion thereof,
        each ticket having an identical ticket price,
        in which a first ticket of the supply of tickets has a first unallocated portion,
        in which a second ticket of the supply of tickets has a second unallocated portion, and
        in which the second unallocated portion is less than the first unallocated portion; and
    acquiring an additional ticket.

11. The method of claim 10, in which the step of acquiring an additional ticket comprises:
    counting a number of tickets having an unallocated portion that is above a first predetermined threshold; and
    acquiring an additional ticket if the number of tickets having an unallocated portion that is above the first predetermined threshold is below a second predetermined threshold.

12. The method of claim 10, in which the step of acquiring an additional ticket comprises:
    receiving an indication of a requested portion;

counting a number of tickets having an unallocated portion that is above the requested portion; and acquiring an additional ticket if the number of tickets having unallocated portion that is above the requested portion is below a predetermined threshold.

13. The method of claim 10, in which the step of acquiring an additional ticket comprises:

acquiring a predetermined number of additional tickets.

14. The method of claim 10, further comprising:

calculating a sum of the unallocated portions of the tickets.

15. The method of claim 14, in which the step of acquiring an additional ticket comprises:

acquiring an additional ticket if the calculated sum is below a predetermined threshold.

16. An apparatus for facilitating the purchase of fractional lottery tickets using a point-of-sale terminal, comprising:

a storage device; and a processor connected to the storage device, the storage device storing a program for controlling the processor; and the processor operative with the program to:

determine a monetary value;

allocate a portion of a ticket, the portion being based on the monetary value, in which the ticket is associated with a predetermined price, and in which the predetermined price is greater than the monetary value;

output a ticket identifier that identifies the ticket and a portion identifier that identifies the allocated portion of the ticket; and store the ticket identifier and the portion identifier in the storage device, in which the processor is further operative with the program to:

determine a monetary value based on an amount of change due for a purchase.

17. The apparatus of claim 16, in which the processor is further operative with the program to:

select the ticket from a plurality of tickets.

18. The apparatus of claim 17, in which the processor is further operative with the program to:

select a ticket having an unallocated portion at least as great as the monetary value.

19. The apparatus of claim 17, in which the processor is further operative with the program to:

determine a set of tickets that each have an unallocated portion at least as great as the monetary value; and select a ticket from the set of tickets which has a minimal unallocated portion.

20. The apparatus of claim 16, in which the processor is further operative with the program to:

round the amount of change due to a predetermined multiple, thereby generating a rounded change amount; and set the monetary value equal to the rounded change amount.

21. The apparatus of claim 20, in which the processor is further operative with the program to:

round down the amount of change due to a predetermined multiple, thereby generating a rounded-down change amount.

22. The apparatus of claim 16, in which the processor is further operative with the program to:

output an offer to exchange a fractional lottery ticket for change due.

23. The apparatus of claim 16, in which the processor is further operative with the program to:

determine a prize value of the ticket; and determine a portion of the prize value based on the allocated portion of the ticket.

24. The apparatus of claim 16, in which the processor is further operative with the program to:

determine a prize value of the ticket; and provide a portion of the prize value based on the allocated portion of the ticket.

25. The apparatus of claim 16, in which the processor is further operative with the program to:

maintain a supply of tickets, each ticket having an unallocated portion thereof, each ticket having an identical ticket price, in which a first ticket of the supply of tickets has a first unallocated portion, in which a second ticket of the supply of tickets has a second unallocated portion, and in which the second unallocated portion is less than the first unallocated portion; and acquire an additional ticket.

26. The apparatus of claim 25, in which the processor is further operative with the program to:

count a number of tickets having an unallocated portion that is above a first predetermined threshold; and acquire an additional ticket if the number of tickets having an unallocated portion that is above the first predetermined threshold is below a second predetermined threshold.

27. The apparatus of claim 25, in which the processor is further operative with the program to:

receive an indication of a requested portion;

count a number of tickets having an unallocated portion that is above the requested portion; and acquire an additional ticket if the number of tickets having unallocated portion that is above the requested portion is below a predetermined threshold.

28. The apparatus of claim 25, in which the processor is further operative with the program to:

acquire a predetermined number of additional tickets.

29. The apparatus of claim 25, in which the processor is further operative with the program to:

calculate a sum of the unallocated portions of the tickets.

30. The apparatus of claim 29, in which the processor is further operative with the program to:

acquire an additional ticket if the calculated sum is below a predetermined threshold.

* * * * *